(12) United States Patent
Namuduri et al.

(10) Patent No.: US 9,973,028 B2
(45) Date of Patent: May 15, 2018

(54) APPARATUS AND METHOD FOR GRID-TO-VEHICLE BATTERY CHARGING

(71) Applicant: GM Global Technology Operations LLC, Detroit, MI (US)

(72) Inventors: Chandra S. Namuduri, Troy, MI (US); Rashmi Prasad, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 14/896,994

(22) PCT Filed: Jun. 23, 2014

(86) PCT No.: PCT/US2014/043734
§ 371 (c)(1),
(2) Date: Dec. 9, 2015

(87) PCT Pub. No.: WO2014/205452
PCT Pub. Date: Dec. 24, 2014

(65) Prior Publication Data
US 2016/0105056 A1     Apr. 14, 2016

Related U.S. Application Data

(60) Provisional application No. 61/837,985, filed on Jun. 21, 2013.

(51) Int. Cl.
*H02J 7/00*     (2006.01)
*H02J 7/02*     (2016.01)
(Continued)

(52) U.S. Cl.
CPC .............. *H02J 7/025* (2013.01); *B60L 11/18* (2013.01); *H02J 5/00* (2013.01); *H02J 7/02* (2013.01)

(58) Field of Classification Search
CPC .............. H02J 7/025; H02J 7/02; B60L 11/18
(Continued)

(56) References Cited

U.S. PATENT DOCUMENTS

| 4,437,146 A | 3/1984 | Carpenter |
| 5,343,079 A * | 8/1994 | Mohan ............... H02J 9/062 |
| | | 307/105 |

(Continued)

OTHER PUBLICATIONS

Kamil, Mohammad, Switch Mode Power Supply (SMPS) Topologies (Part 1), AN1114 Data sheet (online), Microchip Technology Inc., 2007 (retrieved Sep. 27, 2014); retrieved from: http://www.microchip.com/download/en/AppNotes/01114A.pdf, pp. 1-48.

(Continued)

*Primary Examiner* — M'Baye Diao
(74) *Attorney, Agent, or Firm* — Cynthia R. Parks; Parks IP Law LLC

(57) ABSTRACT

A charging system for use in providing power for charging a battery. The system includes a first, alternating-current-to-direct-current, stage and a second, direct-current-to-direct-current, stage. The first stage includes a single-phase diode rectifier for rectifying an input alternating-current input voltage, and a power-factor-correcting sub-circuit including a switch. The second stage includes multiple switches. The system further includes a high-frequency capacitor connected between the first stage and the second stage. The system also includes a controller connected to the switches of the first and second stages and configured to control, by way of the switches, timing of boost inductor current passing through the charging system.

20 Claims, 14 Drawing Sheets

(51) Int. Cl.
  *H02J 5/00* (2016.01)
  *B60L 11/18* (2006.01)
(58) Field of Classification Search
  USPC .......................................................... 320/108
  See application file for complete search history.

(56) References Cited

U.S. PATENT DOCUMENTS

| | | | |
|---|---|---|---|
| 5,923,547 A | 7/1999 | Mao | |
| 6,147,882 A * | 11/2000 | Huber | H02M 1/10 363/143 |
| 6,548,985 B1 | 4/2003 | Hayes et al. | |
| 7,218,081 B2 * | 5/2007 | Jang | H02M 3/335 323/222 |
| 7,768,800 B2 * | 8/2010 | Mazumder | H02M 5/458 363/17 |
| 9,312,767 B2 * | 4/2016 | Sandner | H02M 3/158 |
| 2004/0062059 A1 * | 4/2004 | Cheng | B60L 11/1814 363/17 |
| 2008/0272748 A1 * | 11/2008 | Melanson | H02M 1/4225 323/207 |
| 2010/0027304 A1 | 2/2010 | Wang et al. | |
| 2010/0320949 A1 | 12/2010 | Fotherby | |
| 2011/0203779 A1 * | 8/2011 | Dawes | F25B 49/005 165/121 |
| 2011/0221279 A1 * | 9/2011 | Ratnaparkhi | H02M 5/4585 307/151 |
| 2011/0305050 A1 | 12/2011 | Krein et al. | |
| 2014/0268952 A1 * | 9/2014 | Tong | H02M 1/4241 363/89 |

OTHER PUBLICATIONS

Musavi, Fariborz, A High-Performance Single-Phase Bridgeless Interleaved PFC Converter for Plug-In Hybrid Electric Vehicle Battery Chargers, IEEE Transactions on Industry Applications, vol. 47, No. 4, Jul./Aug. 2011 (retrieved Sep. 28, 2014); retrieved from: IEEE pp. 1833-1843.

International Search Report and Written Opinion dated Nov. 3, 2014 for related PCT patent application No. PCT/US2014/043734.

* cited by examiner

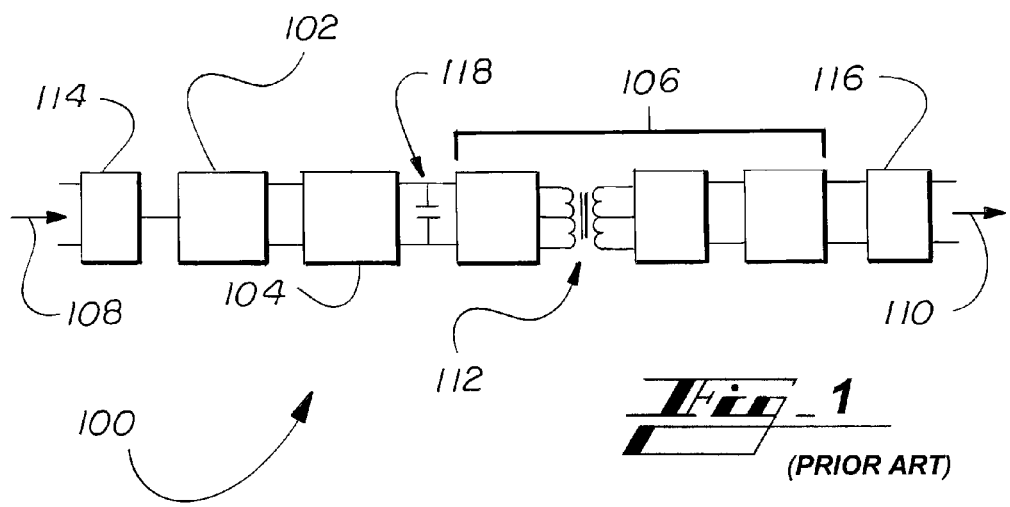
Fig_1
(PRIOR ART)
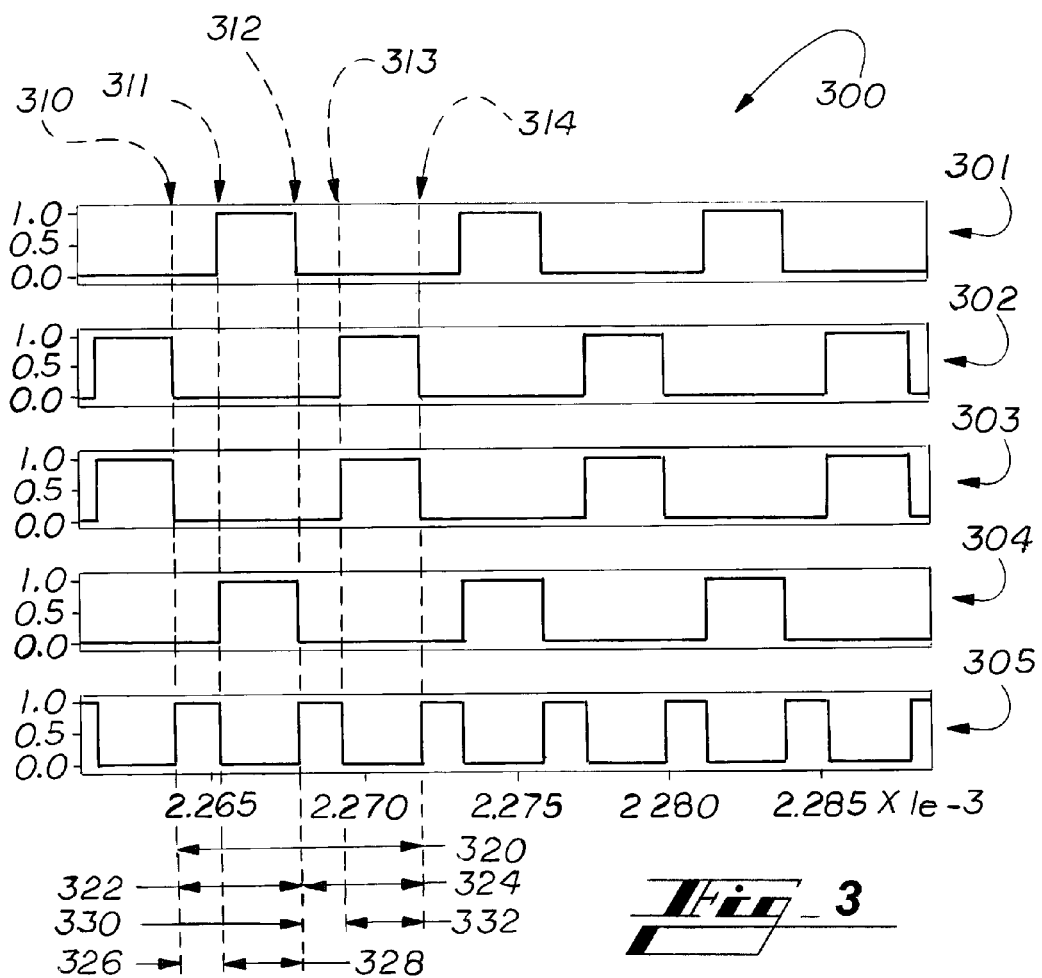
Fig_3

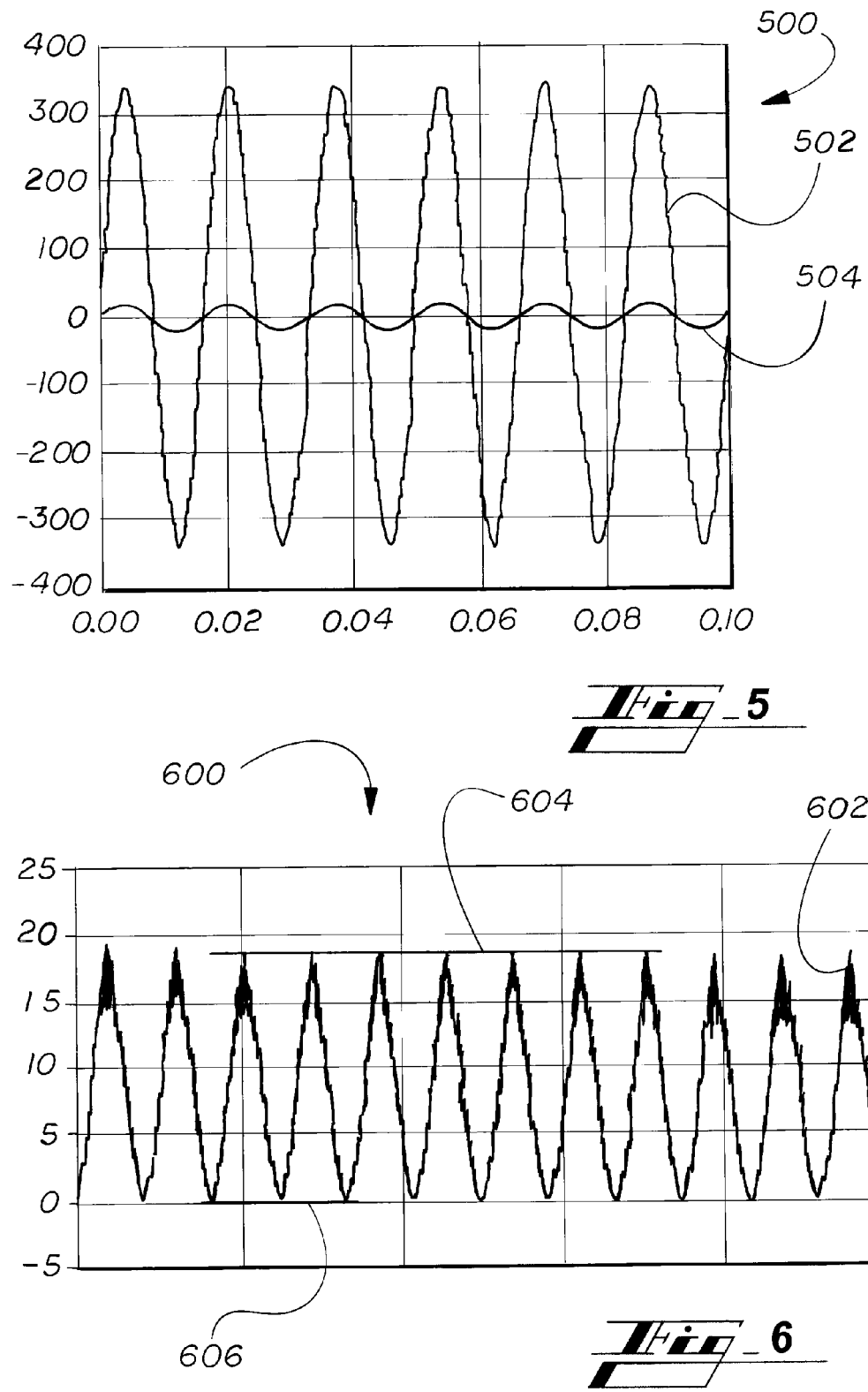

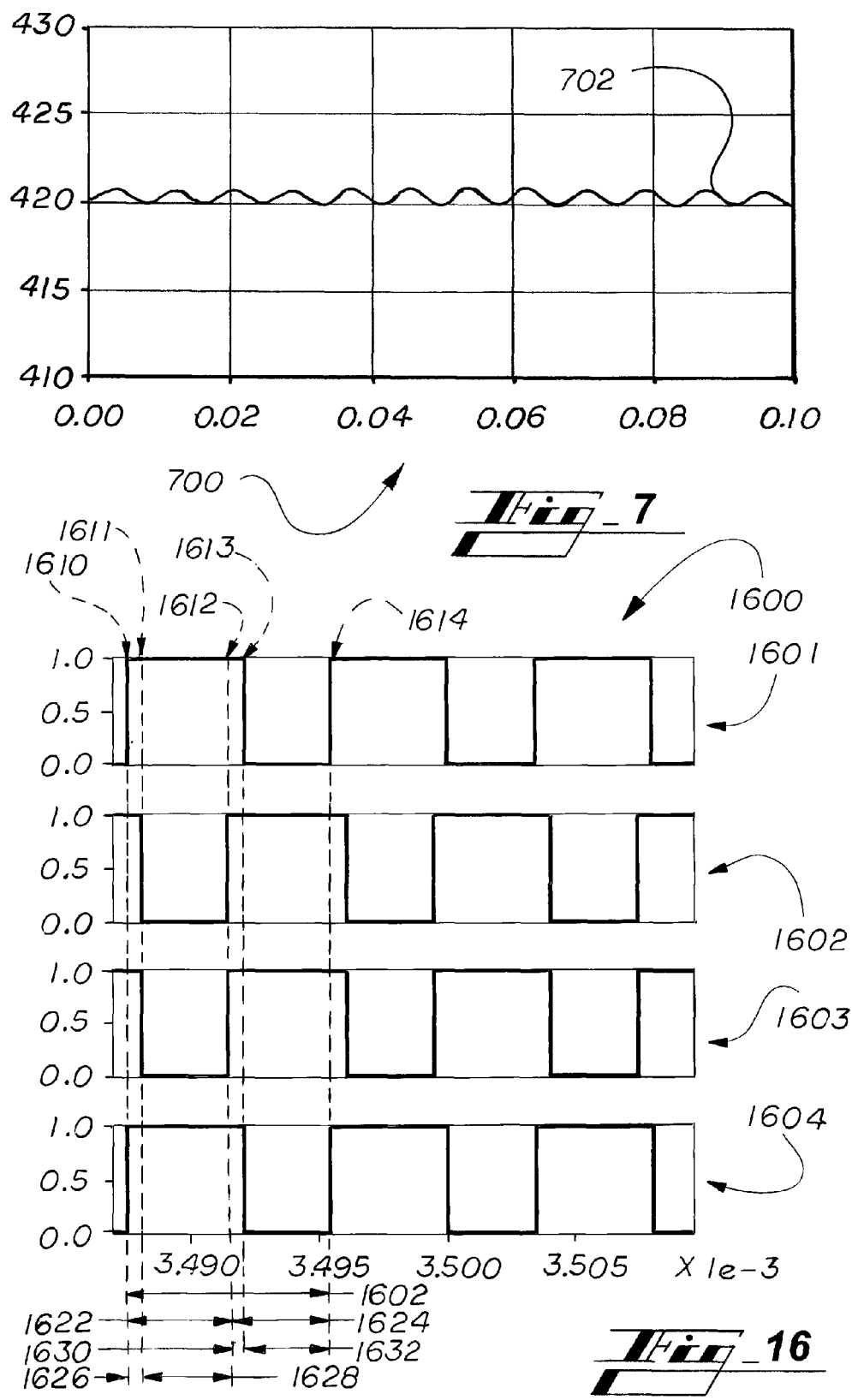

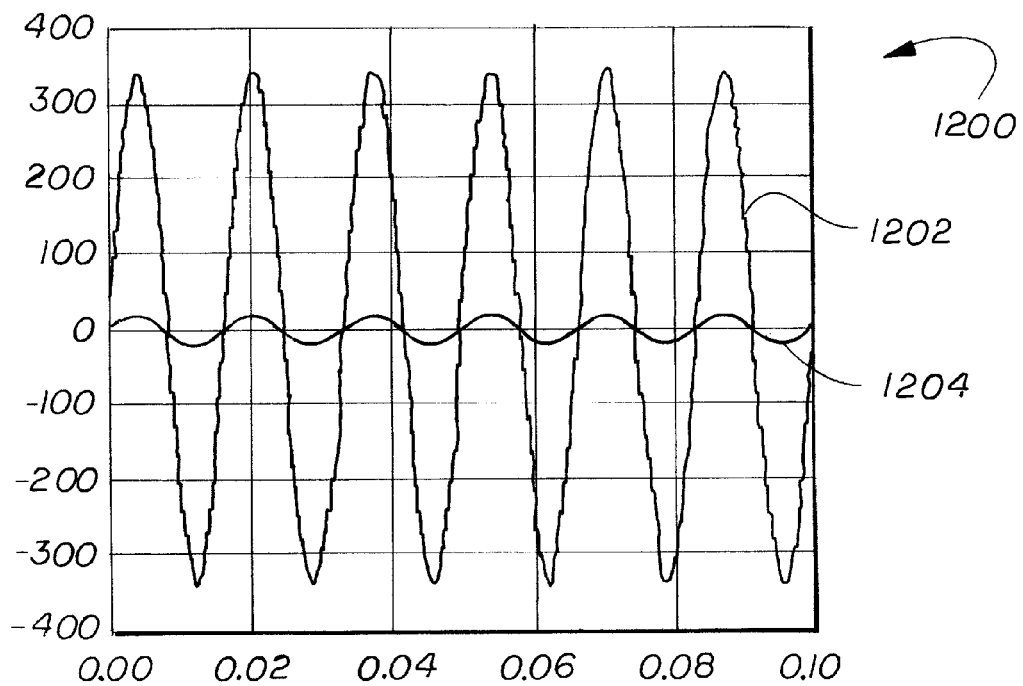
Fig_12
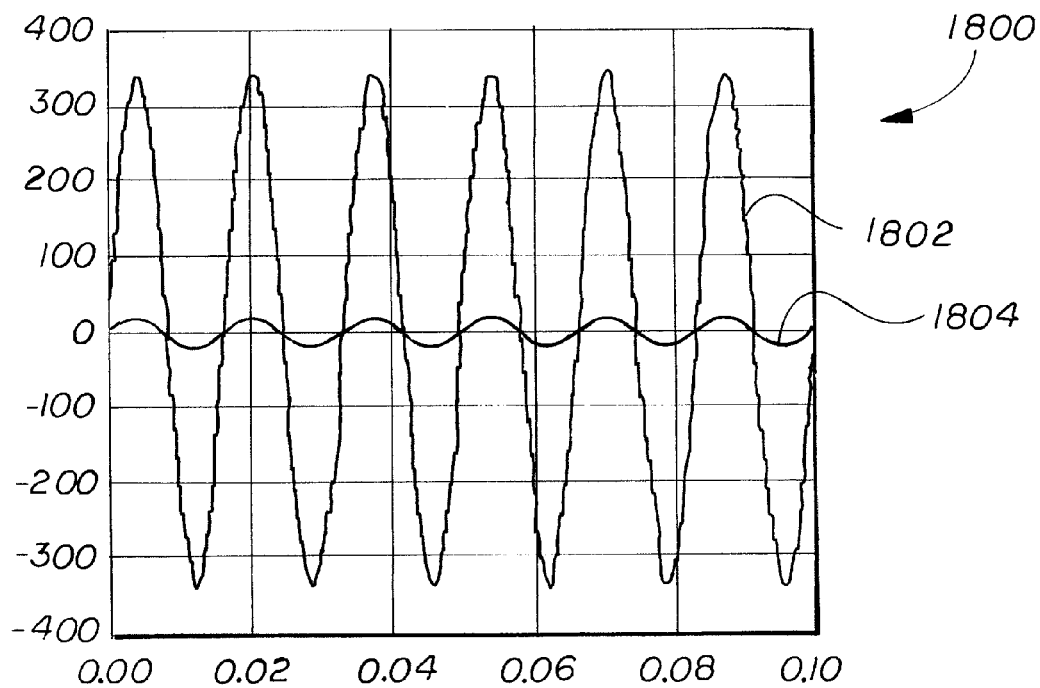
Fig_18

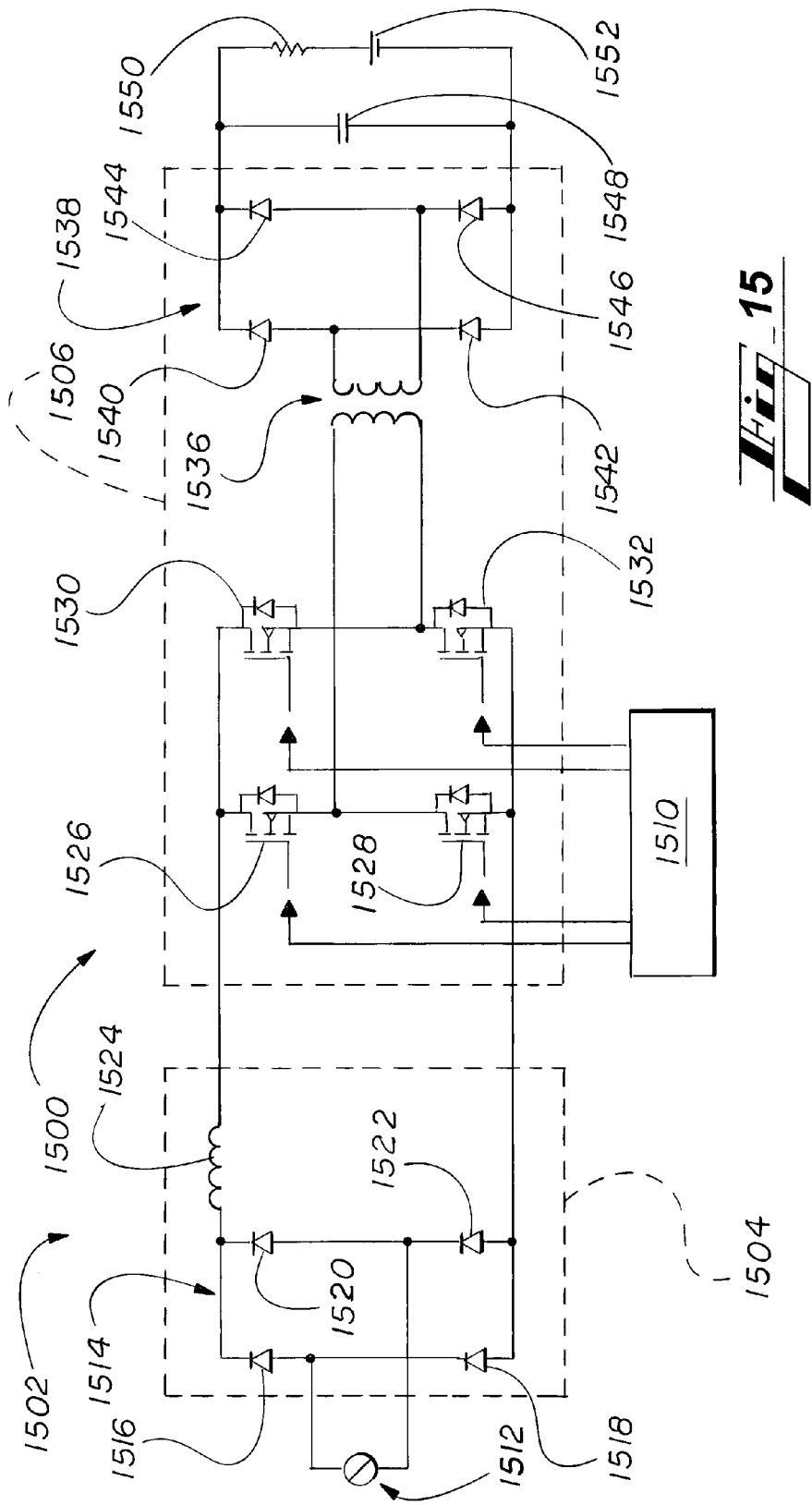

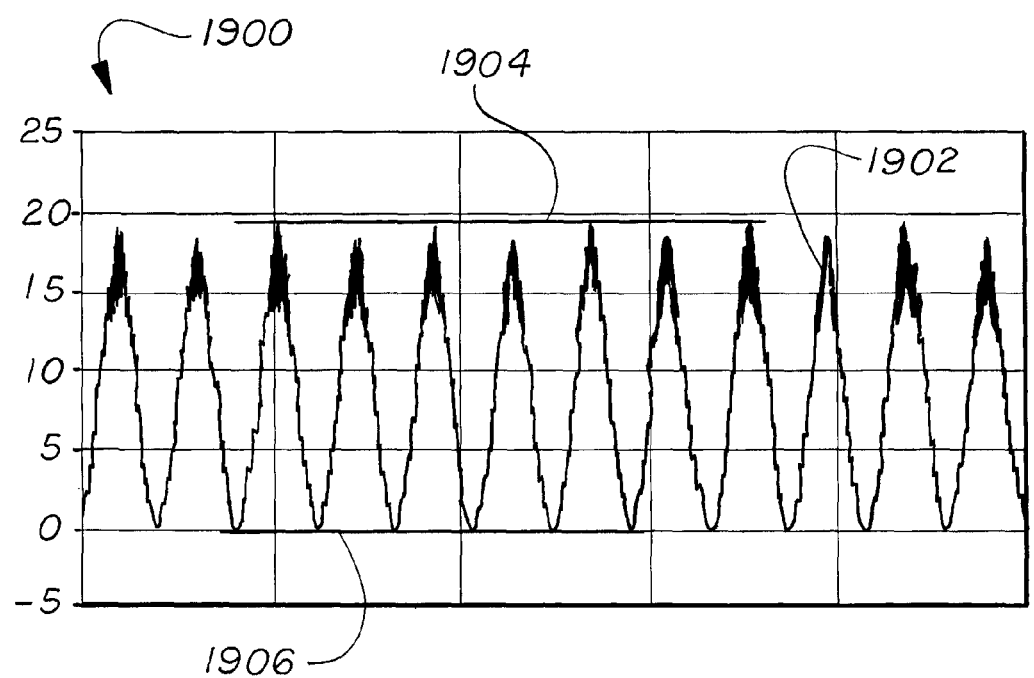
Fig_19
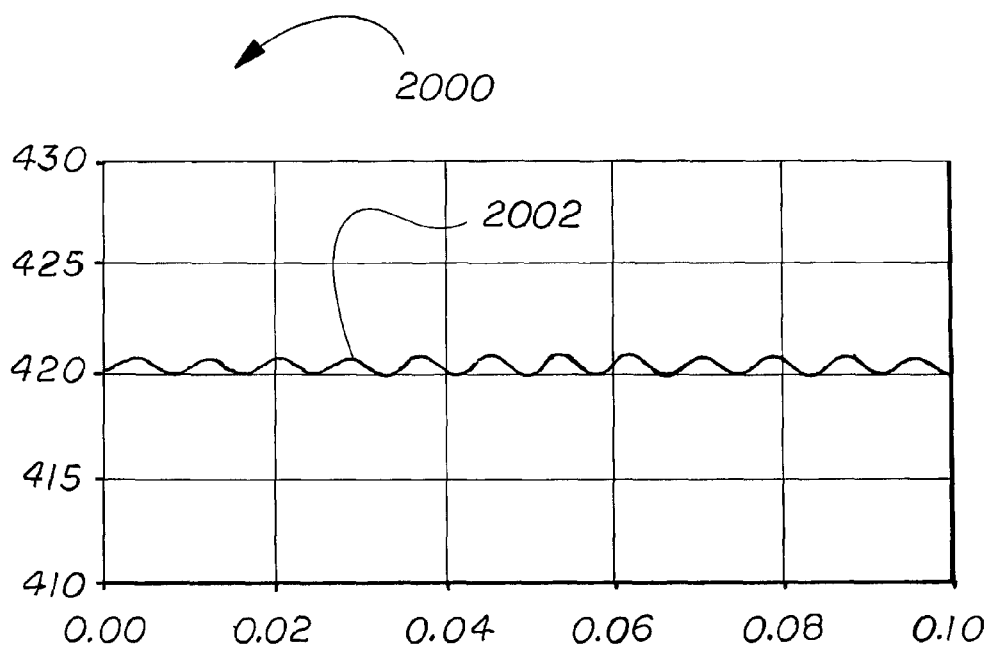
Fig_20

APPARATUS AND METHOD FOR GRID-TO-VEHICLE BATTERY CHARGING

TECHNICAL FIELD

The present disclosure relates generally to apparatus and methods for charging a battery and, more particularly, to apparatus and methods for charging a battery for a hybrid or electric vehicle, such as an automobile, with voltage from an alternating-current source such as an electrical-grid connection.

BACKGROUND

Conventional unidirectional chargers consist of three stages. FIG. 1 shows a power circuit schematic 100 of the conventional charger. A first conventional stage 102 is an alternating-current-to-direct-current (AC-DC) diode-rectifier stage, a second stage 104 is a power-factor-correction stage, and a third stage 106 is an isolated direct current-to-direct current (DC-DC) converter stage.

The first stage 102 is for converting an AC, sinusoidal, current 108 into a DC rectified sinusoidal current. The second stage 104 is for shaping the input current. The third stage 106 is for regulating the output voltage 110 to be provided to the battery (not shown). The third stage 106 includes an isolation transformer 112 for galvanic isolation.

The conventional charger 100 shown can also include electro-magnetic interference (EMI) filters 114, 116 at either end of the circuit, as shown.

The charger 100 also includes a relatively large and bulky intermediate DC bus capacitor 118. The capacitor 118 is used for storing low-frequency and high-frequency ripple energy from the input line 108 for providing a pure DC output to the battery side—i.e., the capacitor 118 filters AC power to DC power. The high-frequency ripple results from required high-frequency switching, and the low-frequency ripple is due to a second harmonic frequency component at about twice the line frequency following the power-factor-correction stage 104.

The capacitor 118 can thus be viewed as acting as a stiff DC-voltage input source for the DC-DC converter 106.

Disadvantages of the conventional charger 100 include its larger size and cost, due to the bulky DC capacitor 118, and lower efficiency due to losses in the multiple stages through which power has to be processed.

Still another disadvantage of conventional chargers 100 is that they have lower reliability due to the bulky electrolytic capacitors 118. These capacitors have a limited life span due to drying out of the dielectric.

Yet another disadvantage of conventional chargers 100 is that they require two-stage control: (1) control of input current shaping and DC link voltage regulation—i.e., stabilizing voltage across the bulky DC capacitor 118, and (2) control of output voltage and current. The present invention novelly uses a single-stage control for both input current shaping and output voltage and current control, simplifying greatly the charging apparatus and process.

The above, and other disadvantages, of conventional systems are solved by the present technology.

SUMMARY

As provided, the present disclosure relates generally to apparatus and methods for charging a battery and, more particularly, to apparatus and methods for charging a battery for a hybrid or electric vehicle, such as an automobile, with voltage from an alternating-current source such as an electrical-grid connection.

The arrangement novelly does not include the relatively-large and bulky DC bus electrolytic capacitor of the conventional systems, and includes circuitry and controls to provide controllable charging current at about twice the line frequency. Testing has shown preferred modern batteries (e.g., Li-ion) to have slower capacity degradation during charge cycling, when charged with a DC current having a superimposed AC component, as compared to when being charged with a pure DC current. Hence the present technology provides improved battery life and more efficient charging due to lower battery impedance associated with provision of the DC superimposed by the about twice-line-frequency component.

Other aspects of the present technology will be in part apparent and in part pointed out hereinafter.

BRIEF DESCRIPTION OF THE DRAWINGS

FIG. 1 illustrates a power circuit schematic of a conventional charger.

FIG. 3 illustrates an example timing diagram for control of the switches in the isolated unidirectional charger topology of FIG. 2.

FIG. 5 illustrates a first chart showing data associated with operation of the isolated unidirectional charger of FIG. 2, the data representing a unity-power-factor operation.

FIG. 6 illustrates a second chart showing data associated with operation of the isolated unidirectional charger of FIG. 2, the data representing a charger output current, measured in amperes (or, amps, A), having a ripple at about twice the line frequency.

FIG. 7 illustrates a third chart showing data associated with operation of the isolated unidirectional charger of FIG. 2, the data representing a charger output voltage, measured in volts (V), with a small ripple at about twice the line frequency.

FIG. 12 illustrates a first chart showing data associated with operation of the isolated unidirectional charger of FIG. 8, the data representing a unity-power-factor operation.

8, the data representing a charger output voltage, measured in volts (V), with a small ripple at about twice the line frequency.

FIG. 15 illustrates another improved power circuit schematic, showing an isolated unidirectional charger topology, according to a third embodiment of the present disclosure.

FIG. 16 illustrates an example timing diagram for control of the switches in the isolated unidirectional charger topology of FIG. 15.

Figure 17:
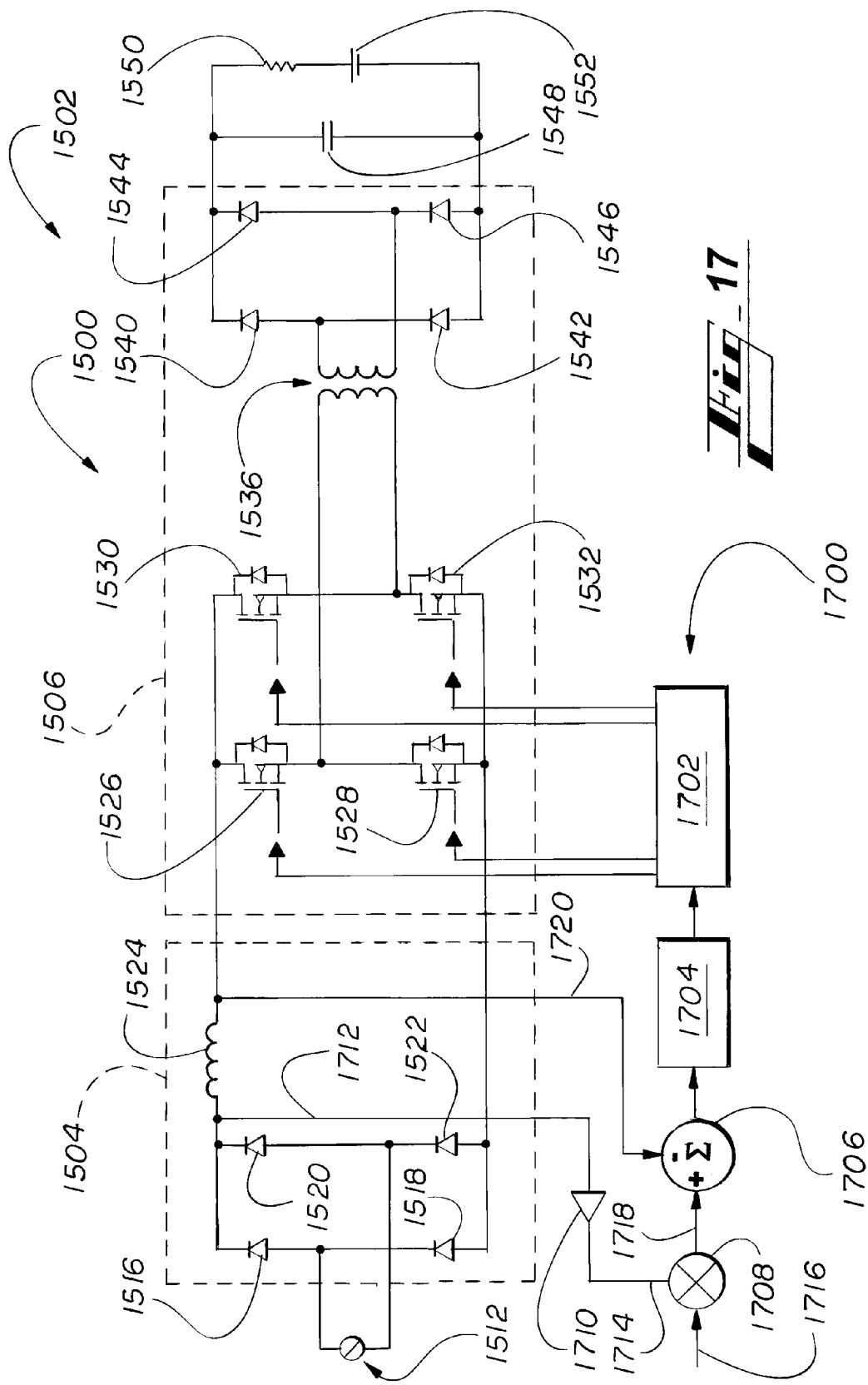

FIG. 17 illustrates an example control diagram for use in controlling the isolated unidirectional charger of FIG. 15.

FIG. 18 illustrates a first chart showing data associated with operation of the isolated unidirectional charger of FIG. 15, the data representing a unity-power-factor operation.

FIG. 19 illustrates a second chart showing data associated with operation of the isolated unidirectional charger of FIG. 15, the data representing a charger output current, measured in amperes (or amps, A), having a ripple at about twice the line frequency.

FIG. 20 illustrates a third chart showing data associated with operation of the isolated unidirectional charger of FIG. 15, the data representing a charger output voltage, measured in volts (V), with a small ripple at about twice the line frequency.

For simplicity and clarity of illustration, elements shown in the figures have not necessarily been drawn to scale. Dimensions of some of the elements may, be exaggerated, for example, relative to other elements for clarity. Further, where considered appropriate, reference numerals may be repeated among the figures to indicate corresponding or analogous elements.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., a description herein of multiple components in connection with one or more functions is to be interpreted to cover embodiments in which a single component performs the function(s).

The figures are not necessarily to scale and some features may be exaggerated or minimized, such as to show details of particular components.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Overview of the Disclosure

In various embodiments, the present disclosure describes apparatus and methods reducing size, mass, and cost of battery chargers for charging batteries of plug-in hybrid and electric vehicles. These and other benefits are achieved in part by minimizing the direct-current (DC) bus filter capacitor used in conventional systems.

While teachings of the present disclosure can be applied to other types of charger apparatus, the disclosure describes primarily herein a unidirectional onboard (e.g., on-vehicle) battery charger.

The apparatus does not use the conventional, bulky, DC bus electrolytic capacitor, and provides a controllable charging current having a variable DC component and an AC component at about twice the input line frequency.

It has been found that modern rechargeable batteries, e.g., lithium-ion (Li-ion) batteries apparently react favorably when receiving a DC charging current superimposed with an AC component having a frequency and amplitude in a preferred range, compared to when receiving pure DC charging current.

It has further been found presently that, with sinusoidal charging current being able to go directly into these modern batteries, ripple power—i.e., DC current with AC current superimposed thereon, the AC current having about twice the line frequency, can now be transferred from the source directly to the load. This enables the use of only a small DC link capacitor, to store the high-frequency (HF) ripple energy, eliminating the need for the relatively large and bulky electrolytic capacitor of conventional chargers, which are used for low-frequency ripple energy storage.

The conventional, DC bus electrolytic, capacitors (e.g., cap 118 of FIG. 1) help convert and filter input AC power to pure DC output power. Circuitry of the present technology eliminates the conventional DC bus electrolytic capacitor. The novel circuitry converts the input AC power to output DC power having a relatively-large ripple, being at about twice the line frequency, as opposed to providing a pure DC output power, by performing less filtering.

Minimizing the DC link capacitor, and providing appropriate supporting circuitry, including control circuit, according to the present technology has benefits including achieving a smaller, lower-mass, and lower-cost charger as compared to conventional chargers. The DC link capacitor is minimized by removing the conventional large DC link electrolytic capacitor used for low frequency ripple energy storage.

Benefits of the present technology also include increased reliability due to elimination of electrolytic capacitors and improvements in battery-charging efficiency, and battery life, due to the ability to provide effectively and efficiently a charging current having a low-frequency ripple. Lithium-ion batteries, e.g., have been found to offer lower effective impedance when receiving the charge current having the low-frequency ripple as compared to receiving pure DC current.

Figure 2:
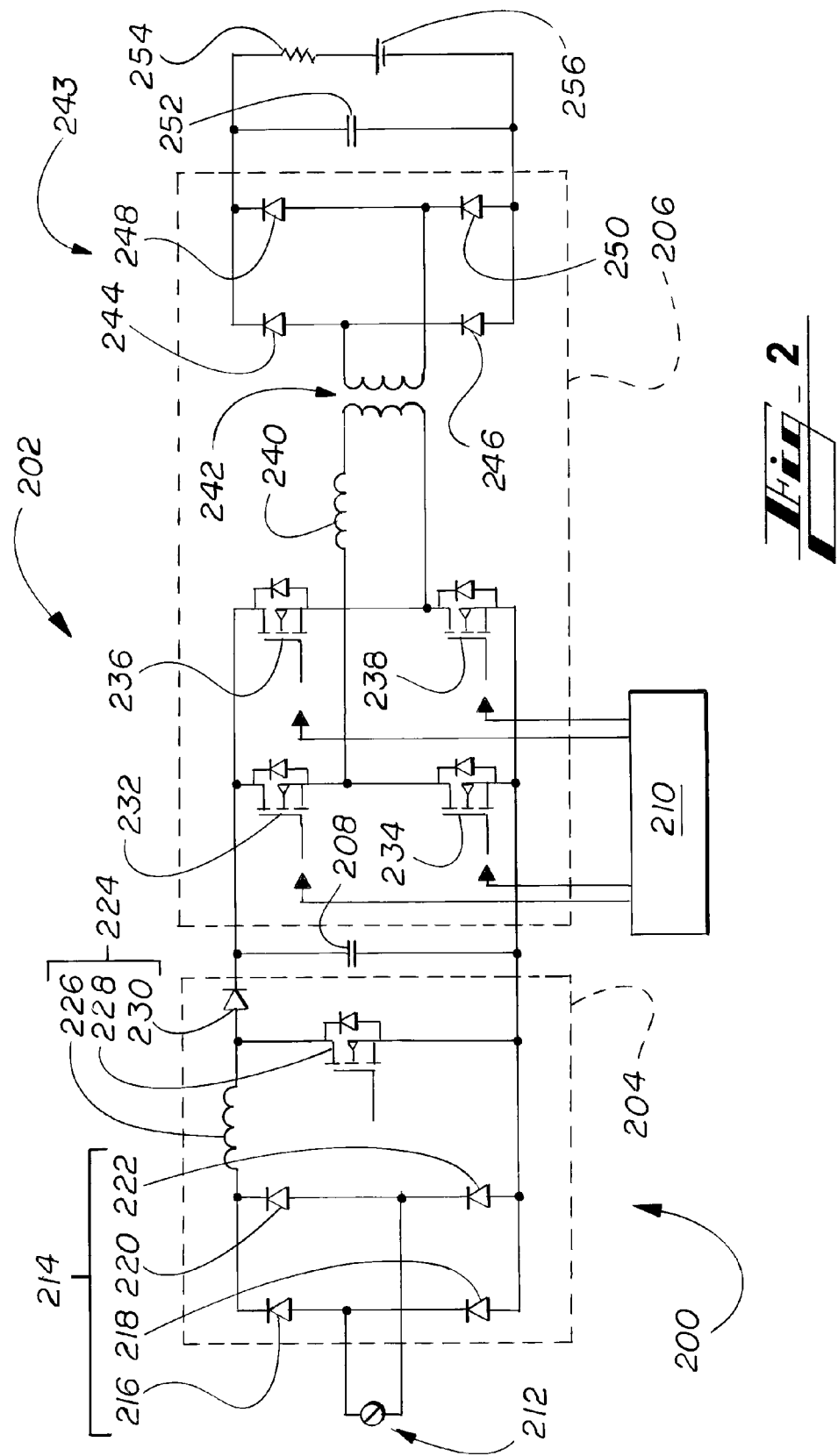
FIG. 2 illustrates an improved power circuit schematic, showing an isolated unidirectional charger topology, according to a first embodiment of the present disclosure.

II. FIG. 2—Power Circuitry According to a First Embodiment

Turning again to the figures, and more particularly to the second figure, FIG. 2 illustrates schematically an improved power circuit 200, including topology of an isolated unidirectional charger 202, according to a first embodiment of the present disclosure.

As described further below, the circuitry can be viewed to include two primary stages, an alternating-current-to-direct-current (AC-DC) 204 stage and a DC-DC stage 206, separated by a high-frequency capacitor 208. Switches of the stages are controlled by one or more controller components 210. The control circuitry is described further below in connection with present FIG. 2 as well as FIGS. 3 and 4.

The schematic 200 also shows an alternating-current (AC) voltage input, or terminal 212. The voltage 212 is provided by an AC voltage source (not shown in detail). The source is any appropriate AC voltage source, such as at a home or fuel-station, and can include an AC generator.

The source in some implementations includes, or is a part of, an intelligent energy network or grid. While the input voltage may be referred to at times herein as a grid voltage, sources include generators, or any source of sufficient levels of AC voltage.

With continued reference to FIG. 2, the first stage 204 of the charger 202 can be seen to include a single-phase diode rectifier 214. In operation, the rectifier circuit, or rectifier 214 rectifies the AC input voltage 212. The rectifier 214, e.g., rectifies the input AC voltage 212 and the power-factor correcting circuit 224 provides input current shaping.

While the rectifier 214 can include other configurations and number of diodes, in the implementation shown, the rectifier 214 includes four diodes 216, 218, 220, 222 arranged as shown.

The first stage 204 of the charger 202 further includes a power-factor-correcting (PFC) sub-circuit 224. In operation of the charger 202, the PFC sub-circuit 224 supplements the rectifier sub-circuit 214 to meet current harmonic limits.

In the implementation of FIG. 2, the PFC sub-circuit 224 includes a boost inductor 226 ($L_{boost}$).

The PFC sub-circuit 224 also is shown to include a PFC switch 228. Operation of the switch 228, and each illustrated switch, is described further below. The PFC sub-circuit 224 is also shown to include a PFC diode 230.

As provided, the PFC circuit 224 and preceding single-phase diode rectifier 214 can be viewed as parts of the first, AC-DC, stage 204, which is indicated in FIG. 2 by dashed line.

In some embodiments, one or more of the switches (228, 232, etc.) is part of, or includes, a semiconductor device or transistor, such as a metal-oxide semiconductor field-effect transistor (MOSFET). The transistor would include a diode, as shown in the details of FIG. 2, in the icon representing the switches.

As also provided, the charger 202 includes, connecting the AC-DC and DC-DC stages 204, 206, a high-frequency (HF) capacitor 208, e.g., a HF DC link capacitor. In operation of the charger 202, energy can result from primary winding leakage inductance. The HF DC link capacitor 208 provides a freewheeling path for current associated with this energy.

With reference to the second, DC-DC, stage 206 in FIG. 2, functions include acting effectively as a full-bridge direct-current-to-direct current (DC-DC) converter. The stage 206 includes multiple switches. While the stage 206 may include other arrangements and numbers of switches, in the illustrated embodiment, the stage includes four switches 232, 234, 236, 238.

As further shown in the embodiment of FIG. 2, the DC-DC stage 206 also includes a high-frequency (HF) transformer 242. In operation, the HF transformer 242 provides electrical isolation for the stage 206, and can be referred to as an isolation transformer.

The DC-DC stage 206 is also shown to include an inductor 240. The inductor 240 is the leakage inductance of the transformer 242 on its primary side—said in other terms, the inductor 240 is the transformer leakage inductance referred to the primary side.

The transformer 242, like each transformer disclosed herein, can be considered to operate at any appropriate ratio to accomplish desired goals, including those described herein. The ratio can be referred to generically as being 1:N, where N includes any positive, non-zero, number.

The charger 202 of this embodiment also includes a DC-DC-stage rectifier 243 coupled to an output side of the isolation transformer 242.

The second, DC-DC, stage rectifier 243 includes a diode group. While the group can include other arrangements and numbers of diodes, in the implementation of FIG. 2, the group includes four diodes 244, 246, 248, 250 (or, $D_5$-$D_8$), as shown.

Following the DC-DC stage 206, embodiments of the charger 202 also include another capacitor 252, for filtering high-frequency (HF) ripple. The charger 202 also includes a resistor 254, representing the internal effective battery resistance. The charger 202 includes an output terminal 256 by which voltage is provided to the battery to be charged—the battery is not shown in detail, and is, rather, represented approximately by the DC voltage source 256 and internal resistance 254.

As referenced above, the charger 202 includes a controller 210 that, in operation, controls switches of the two power stages 204, 206. More particularly, for the present example embodiment, the controller 210 controls the opening and closing of the full-bridge active switches 232, 234, 236, 238, as well as of the power-factor-correcting boost converter switch 228.

By controlling the switches, the control components, referred to also generally as a controller 210, control, e.g., timing of a boost inductor current passing through the charger 202. And by doing so, the controller 210 controls the full-bridge functions of the second stage 206 for supplying the desired, primarily DC, charging current to the battery—i.e., a current having a relatively large ripple (AC current superimposed on the DC current), such as a ripple equal to about twice the amplitude of the average DC current at about twice the line frequency. Benefits of this operation are referenced above, including by comparison to conventional chargers, and described further below.

III. FIG. 3—Timing Diagram for Controlling First-Embodiment Charger

FIG. 3 illustrates an example timing diagram 300 for control of the switches of the isolated unidirectional charger topology of FIG. 2.

The diagram 300 includes multiple sub-charts, each corresponding to one of the switches of the circuit 200 of FIG. 2. More particularly, the sub-charts 301, 302, 303, 304, 305, from top to bottom in FIG. 3, show respectively switching sequences (ON/OFF, or closed/open) for the first, second, third, and fourth switches 232, 234, 236, 238 of the DC-DC stage 206, and the PFC switch 228 of the rectifier sub-circuit 224.

Each of sub-charts 301, 302, 303, 305, 306 includes an x-axis representing passage of time and, therein, time periods described more below. Each sub-chart also includes a y-axis showing 0, 0.5, and 1.0 corresponding to whether the corresponding switch 232, 234, 236, 238, 228 is OFF (zero, 0) or ON (1.0) during the time periods.

As shown in FIG. 3, five reference points in time, and so along the y-axes, are called out, by numerals 310, 311, 312, 313, and 314 (or, $t_0$-$t_4$).

An overall switching cycle, or sequence 320 is considered to begin at a starting, or start, reference time 310 (or, $t_0$) and end at a fourth reference time 314 (or, $t_4$).

The switching sequence 320 includes two primary switching cycles 322, 324 (or sub-cycles). The first switching cycle 322 begins at the start reference time 310 (or, $t_0$) and ends at the second reference time 312 (or, $t_2$). The second switching cycle 324 starts at the second reference time 312 (or, $t_2$) and ends at the fourth reference time 314 (or, $t_4$).

Of the first cycle 322, a first time interval 326 begins at the start reference time 310 (or, $t_0$) and ends at the first reference time 311 (or, $t_1$). As shown in the last sub-chart 305, at the start 310 ($t_0$) of the first cycle 322, the PFC switch 228 is turned ON (i.e., closed) and remains ON for the entirety of the first interval 326.

The first time interval 326 ($t_0$-$t_1$) can be represented by D(t)•T(s), where D(t) is a duty cycle, such as a pulse-width-modulated (PWM) variable duty cycle, and T(s) is time. In operation of the charger 202, the duty cycle D(t) is generated by control circuitry, associated with the afore-mentioned controller 210, and described further below in connection with FIG. 4. This closed switching action activates the boost operation, storing energy in the current shaping boost inductor 226.

As in the first interval 326, in the third interval 330 (between 312 and 313; or, $t_2$-$t_3$), starting the second cycle 324, the interval period is D(t)•T(s).

In one embodiment, the period of both the second interval 328 and the fourth interval 332 is represented by (1−D(t))•T(s).

In operation, as can be seen in FIG. 3, in every odd interval, the PFC switch 228 is ON and each of the four DC-DC-stage switches 232, 234, 236, 238 is OFF.

And in each even interval (second, fourth, sixth, etc.), the PFC switch 228 is OFF, and an alternating two of the four DC-DC-stage switches are ON. Namely, the first and fourth DC-DC-stage switches 232, 238 are ON in alternating sequence with the second and third switches DC-DC-stage switches 234, 236. The first and fourth DC-DC-stage switches 232, 238 are ON in every other even interval, starting with the second interval (i.e., second interval, sixth interval, etc.), while the second and third switches are OFF. The second and third switches DC-DC-stage switches 234, 236 are ON in the other even interval starting with the fourth even interval 332 (fourth interval, eighth interval, etc.), while the first and fourth switches are OFF. Accordingly, the first and fourth DC-DC-stage switches 232, 238 are ON while the second and third DC-DC-stage switches 234, 236 are OFF, and vice-versa.

Which set of switches is ON while the others are OFF controls a direction of the current through the circuit 200, and more particularly through the transformer.

According to these sequences, the full-bridge stage (206) switch components enable a current path between the DC link capacitor 208 and energy in the transformer leakage inductor 240.

As referenced above, in the second switching cycle 324, the PFC switch 228 repeats its operation pattern of the first switching cycle 322. The PFC switch 228 being ON while the full-bridge switches are OFF, results in a boosting, or boost stage. The boosting, occurring every switching cycle (e.g., in the first cycle 322, in the second cycle 324, etc.), results from the short circuit created by the PFC switch 228 being ON (closed position) and the full-bridge switches being OFF during the period. With the PFC switch ON, a short is created between the inductor and the negative side of the DC bus.

Figure 4:
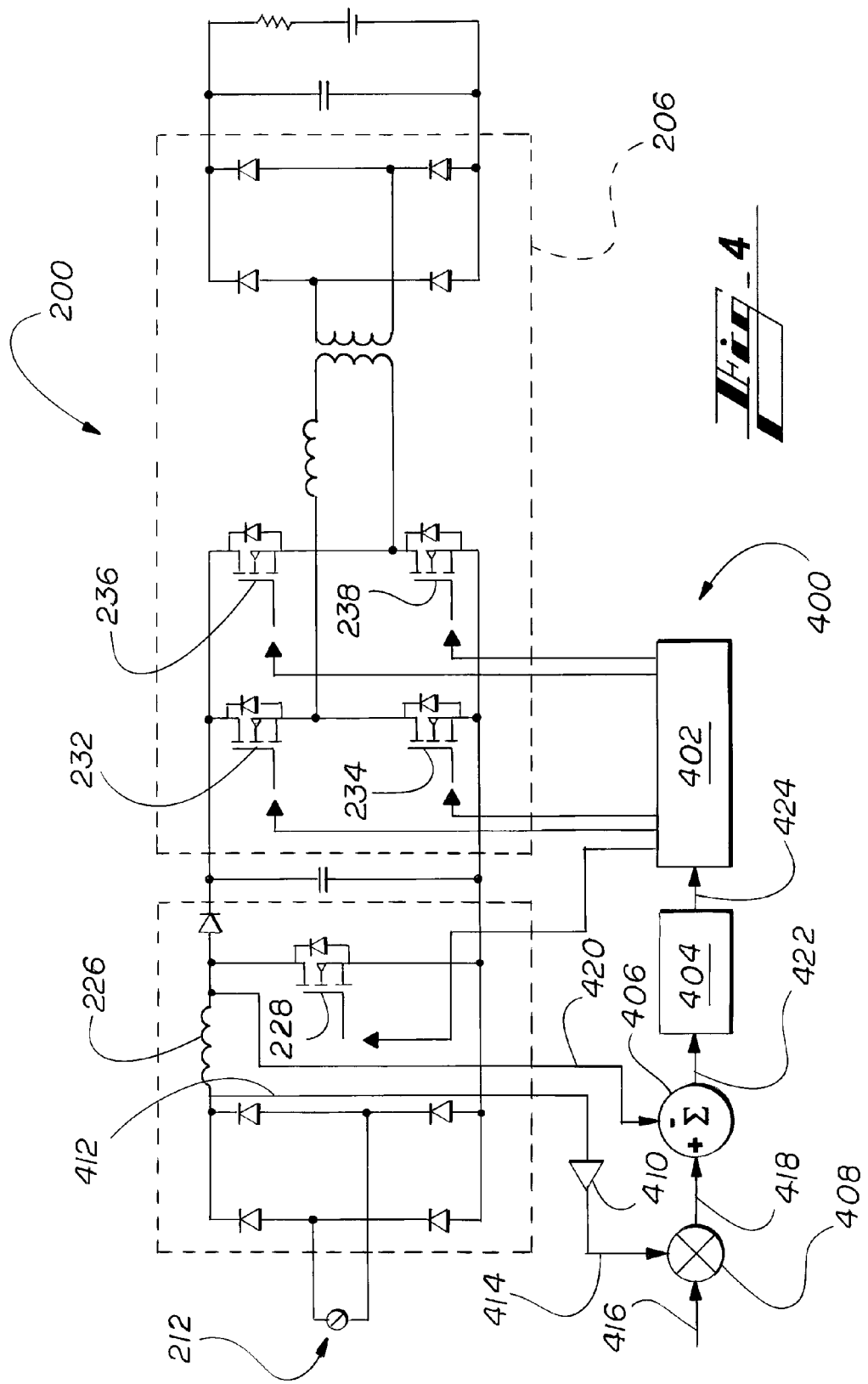
FIG. 4 illustrates an example control diagram for use in controlling the isolated unidirectional charger of FIG. 2.

IV. FIG. 4—Control Diagram for First-Embodiment Charger

FIG. 4 illustrates a block diagram showing the power circuit schematic, like that of FIG. 2, with more detail about the control features 210. The control features 210 include control circuitry 400 and functions thereof.

In FIG. 4, newly identified parts are indicated by new reference numbers and, for brevity, reference numbers for parts common with FIG. 2 are provided using their FIG. 2 reference numerals or are not provided.

Generally, in operation of the charger 200, the control circuit 400 generates pulse-width-modulated (PWM) control signals that control the ON/OFF time interval of the switches 228, 232, 234, 236, 238.

The control circuit 400 includes a PWM signal generator 402. The control circuit 400 also includes a current controller 404. The circuit 400 further includes a summation component 406, or combiner.

And the circuit 400 includes a multiplier component 408. In some embodiments, the circuit 400 further includes a gain component 410, e.g., amplifier, providing a desired gain (G).

Any of the parts of the control circuit 400 illustrated or described separately can be combined. For instance, in one embodiment, functions of the current controller 404 and the functions of the PWM signal generator 402 are performed in a single component.

For the control functions, a representation 412 of the post-rectifier electrical voltage is taken. The circuit 400 includes or is connected to any instrumentation needed for obtaining this and the other electrical current or voltage data described. The circuit 400 in one embodiment includes or is connected to one or more sensors or meters (not shown in detail), such as a voltmeter or current sensor, configured and positioned to provide the representations used.

The rectifier-output-voltage representation 412 is multiplied by the gain component 410 and passed as input 414 to the multiplier 408. The input 414 ensures the shape of the input current based on the template of the form |Sin(ωt)|— i.e., absolute value of the sine of ω*t, wherein ω (omega) represents angular frequency, and t is time, provided by measuring the rectifier output voltage |VAC(t)|. A main objective of this aspect of the control loop 400 is to draw a sinusoidal current in phase with the utility voltage. The manners of accomplishing this are not limited to the manner described, including that of the example described above— e.g., phase-locked loop, etc.

The multiplier 408 also receives as a second input a pre-determined reference current value 416 (e.g., a pre-set reference peak current value; or, $i_{ref}$). The value 416 can be derived from target battery-input current specifications, such as based on how much charging current or voltage the battery needs at the time.

The output battery voltage can be regulated using another outer voltage control loop giving this reference 416. The outer voltage control loop has not been shown for brevity. The value 416, or the output-battery-voltage reference, can be determined at a vehicle-battery-management system, for instance, or determined based on data received from such a system. Variables for determining these values in some implementations include factors related to battery need, such as battery charge level and an applicable battery-control mode, such as voltage control mode or current control mode.

Using the two inputs 414, 416, the multiplier 408 produces a representation of shape and amplitude of reference inductor current 418 (or $i_L^*(t)$). More particularly, the reference inductor current 418 ($i_L^*(t)$), in one embodiment, has a full-wave rectified form and is obtained using an absolute value of a measured rectifier output voltage $|V_{AC(t)}|$ 414 and the reference peak current value 416.

The summing component 406 combines the reference inductor current 418 ($i_L^*(t)$) and a measured inductor current feedback signal 420 (or, $i_{L(meas)}(t)$), which is taken to have a negative (−) value for the summation, as shown in FIG. 4, for the current loop. The resulting sum represents a difference 422, if any, between the reference current 418 and the measured inductor current 420 ($i_{L(meas)}(t)$). The difference, or, more precisely, the error input, 422 from the summation component 406 is provided as input to the current controller 404.

The current controller 404 generates, based on the difference 422 from the summer 406, the duty cycle 424 (or, D, or D(t)), referenced above. The current controller 404 provides the duty cycle (D(t)) 424 to the pulse-width-modulated (PWM) signal generator 402. The duty cycle can have any of a variety of values without departing from the scope of the present technology.

Using the duty cycle (D(t)) 424, the PWM generator 402 generates PWM control signals for use in controlling the ON/OFF time interval of the switches 228, 232, 234, 236, 238. The generator 402 includes logic for generating these control signals as appropriate with respect to the duty cycle (D(t)) received from the current controller 404.

The generator 402, in various embodiments, takes any of a variety of forms, such as a digital signal processor (DSP), a micro controller or field-programmable gate array (FPGA), etc. In some embodiments, the current controller 404 and/or the generator 402 includes a computer-readable storage device, such as a standard memory, on which computer-executable code, or instructions, configured to cause a computing processor to perform the operations described herein in connection with the component(s) 402, 404.

The control loop, by using the measured inductor current 420 ($i_{L(meas)}(t)$) as the feedback signal, and generating, by the PWMG 402, appropriate signals for the switches 228, 232, 234, 236, 238, controls the form and value of the inductor current (or, $i_{L(meas)}(t)$) to achieve desired power factor correction.

And in these ways, the PFC power circuit 224 is controlled to draw a sinusoidal current in phase with the utility, or input source voltage ($V_{in}$, or VAC(t)).

As provided, DC link voltage regulation is not needed, at least because a pure DC output is no longer needed. Rather, the input-source-ripple power, having in some cases a ripple at about twice the line frequency, not being transferred to an intermediate DC link (e.g., DC bus electrolytic capacitor 118 of FIG. 1), is directed to the output battery load.

In this way, the output power does not have a pure DC form, and is, instead, DC with some AC-form current superimposed thereon—e.g., DC-form current with a large ripple, e.g., a ripple at about twice the line frequency. While voltage having a ripple at about twice the line frequency is referenced often herein, other ripple levels can be used, such as levels below or even above about twice the line frequency.

As referenced above, and contrary to conventional thinking, it has presently been found that passing ripple current—i.e., DC current with some AC current superimposed thereon—to modern batteries (e.g., Li-ion batteries) does not hinder the charging operation or degrade battery performance. Rather, it increases the efficiency of the charge and discharge operations and improves battery performance due to lower effective impedance offered by the battery for such charging currents.

V. FIG. 5—Unity Factor Chart for First Embodiment

FIG. 5 illustrates a first chart 500 showing data associated with example operation of the isolated unidirectional charger of FIG. 2, the data representing a unity-power-factor operation.

A y-axis of the chart 500 has increments between negative four hundred and four hundred. As described further below, with respect to a first data line the increments correspond to values of line voltage (volts). With respect to a second data line, the increments correspond to values of current (Amps). The x-axis indicates time.

Conditions of the example operation include:
an isolated unidirectional charger topology, as described above;
240V root-means-squared (rms) input source voltage (e.g., item 212, or, VAC(t), or $V_{AC}(t)$);
420V of charger output voltage; and
an average output power ($P_{O(avg)}$) of 3.3 kW.

The first line 502 in the chart represents the AC voltage being received by the charger 202 as a function of time, or voltage in ($V_{in}$). The second line 504 represents electrical current provided to the charger 202 over time, or current in ($I_{in}$). The input voltage, represented by the first line 502, is sinusoidal, as shown, and, according to the y-axis increments, peaks at about +/−340V. The input current, represented by the first line 504, is also sinusoidal and, according to the y-axis increments, peaks at about +/−20 A.

As further shown in FIG. 5, the input voltage and input current are appropriately in phase with each other—i.e., zero-phase angle. This is enabled by the power factor correcting (PFC) circuit (e.g., reference 224), which keeps the input current in phase, or nearly in phase, thereby limiting current distortion to a minimum as well as complying to utility requirements and current harmonic standards as needed.

VI. FIG. 6—Charger Output Current

FIG. 6 illustrates a second chart 600 showing data associated with operation of the isolated unidirectional charger of FIG. 2.

In the chart 600, a data line 602 represents a charger output current (y-axis), measured in amperes (or amps, A), as a function of time (x-axis). The DC current output to the battery in this example operation has a relatively-large ripple, at 120 Hz.

The same conditions apply to this example:
an isolated unidirectional charger topology as described above;
an input rms source voltage of 240V;
a charger output DC voltage of 420V; and
an average output power ($P_{O(avg)}$) of 3.3 kW.

The chart 600 shows that the present operation described above (including directing power-source voltage, having ripple up to about twice the traditional line frequency, to the output battery instead of through an intermediate DC link), allows providing, to the battery, peak currents 604, 606 that are much higher (e.g., double) than current provided in pure DC charging modes.

VII. FIG. 7—Charger Output Voltage

FIG. 7 illustrates a third chart 700 showing data associated with operation of the isolated unidirectional charger of FIG. 2.

In the chart 700, a data line 702 represents a charger output voltage (y-axis), measured in volts (V), as a function of time (x-axis). As provided, in the example, the electrical output to the battery operation has a relatively-large ripple, at 120 Hz.

The same conditions apply to this example:
an isolated unidirectional charger topology as described above;
an input voltage (or, item 212, or, VAC, or $V_{AC}$) of 240V;
a charger output voltage of 420V; and
an average output power ($P_{O(avg)}$) of 3.3 kW.

The chart 700 shows that output voltage has a very small ripple, at about twice the line frequency, thus not exceeding voltage ripple requirements for the battery.

Figure 8:
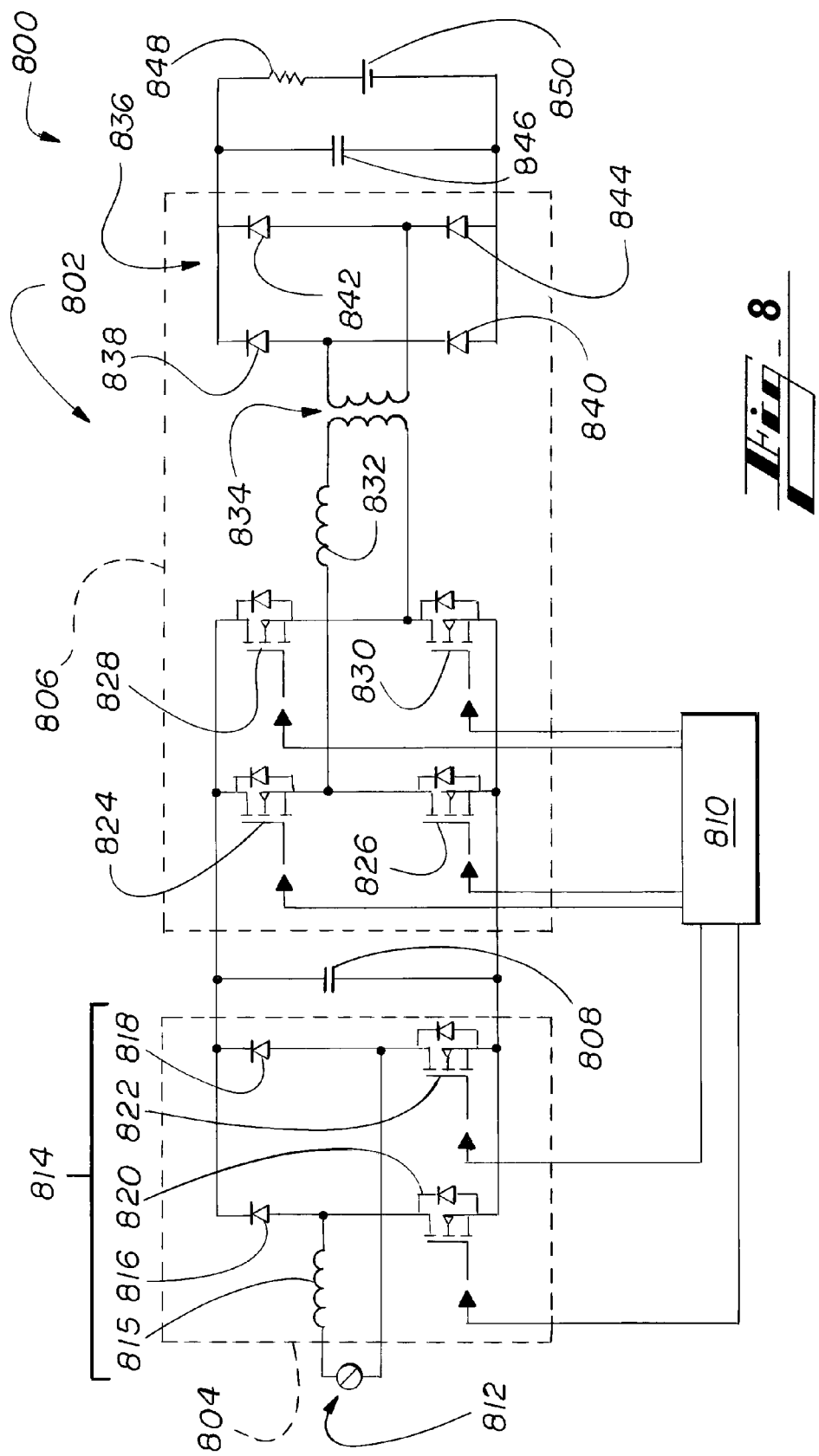
FIG. 8 illustrates a second improved power circuit schematic, showing an isolated unidirectional charger topology, according to a second embodiment of the present disclosure.

VIII. FIG. 8—Power Circuitry According to a Second Embodiment

FIG. 8 illustrates schematically a second improved power circuit 800, showing topology of another isolated unidirectional charger 802, according to a second embodiment of the present disclosure.

As in the previous embodiment (FIG. 2), the circuitry 800 of this embodiment includes two primary stages, a first, alternating-current-to-direct-current (AC-DC) stage 804 and a direct-current-to-direct-current stage 806, separated by a high-frequency (HF) capacitor 808 and controlled by a controller 810.

As in the first embodiment, the controller 810 here receives various inputs, described further below, including in connection with the control circuit 1100 of FIG. 11, and controls operation of the switches of the charger 802.

And, as in the previous embodiment (FIG. 2), the circuit 800 is configured to receive an alternating-current (AC) grid voltage via an input terminal 812. Again, the voltage 812 is provided by an AC input voltage source (not shown in detail). The source is any appropriate AC voltage source, such as at a home or fuel-station, and can include an AC-voltage generator. The source in some implementations includes or is a part of an intelligent energy network or grid. And, as provided, while the input voltage may be referred to herein as a grid voltage, other sources include generators, or any source of sufficient levels of AC voltage.

The first, AC-DC, stage 804 of this embodiment includes a bridgeless boost-rectifier sub-circuit 814, or just, rectifier. In operation, the rectifier 814 rectifies the input AC voltage 812 using a power factor (PF) correction.

The charger 802 also includes, at the input to the bridgeless boost rectifier 814, an alternating-current (AC) inductor 815 (or, $L_{AC}$).

While the rectifier 814 can include other configurations, in the implementation shown, the rectifier 814 includes two diodes 816, 818 and two switches 820, 822.

As also provided, the charger 802 includes, connecting the AC-DC and DC-DC stages 804, 806, a high-frequency (HF) capacitor 808, e.g., a HF DC link capacitor. In operation of the charger 802, energy can result from primary winding leakage inductance. The HF DC link capacitor 808 provides a freewheeling path for current associated with this energy.

The second, DC-DC, stage 806 of the charger 802 of this embodiment also includes multiple switches. While the stage 806 may include other arrangements and numbers of switches, in the illustrated embodiment, the stage includes four switches 824, 826, 828, 830.

The DC-DC stage 806 of this embodiment, like that of the first embodiment of FIG. 2, forms a full-bridge DC-DC converter. And, for this embodiment, the stage 806 includes a high-frequency transformer 834 in connection with this function. In operation, the HF transformer 834, like that of the first embodiment, provides electrical isolation for the stage 806, and so can be referred to as an isolation transformer.

The DC-DC stage 806 also is shown to include an inductor 832. The inductor 832 is the transformer leakage inductance referred to the primary side.

The transformer 834, like each transformer disclosed herein, can be considered to operate at any appropriate ratio to accomplish desired goals, including those described herein. The ratio can be referred to generically as being 1:N, where N includes any positive, non-zero, number.

The DC-DC stage 806 also, like the stage 206 of the first embodiment, includes a rectifier 836 coupled to an output side of the isolation transformer 834. While the rectifier 836 can include other arrangements, e.g., numbers of diodes, in the implementation of FIG. 8, the group includes four diodes 838, 840, 842, 844, as shown.

Following the DC-DC stage 806, embodiments of the charger 202 also include another capacitor 846 which is for high-frequency (HF) filtering and a resistor 848 representing the effective internal resistance of a battery, positioned as shown in FIG. 8. The charger 802 includes an output terminal 850 by which voltage is provided to the battery to be charged—the battery is not shown in detail, and, rather, represented approximately by a DC voltage source 850 and internal resistance 848.

In operation, the controller 810 controls, as represented schematically in FIG. 8, opening and closing of the switches 820, 822 of the bridgeless PFC circuit 814 of the AC-DC stage 804, and the full-bridge switches 824, 826, 828, 830 of the DC-DC stage 806.

Figure 9:
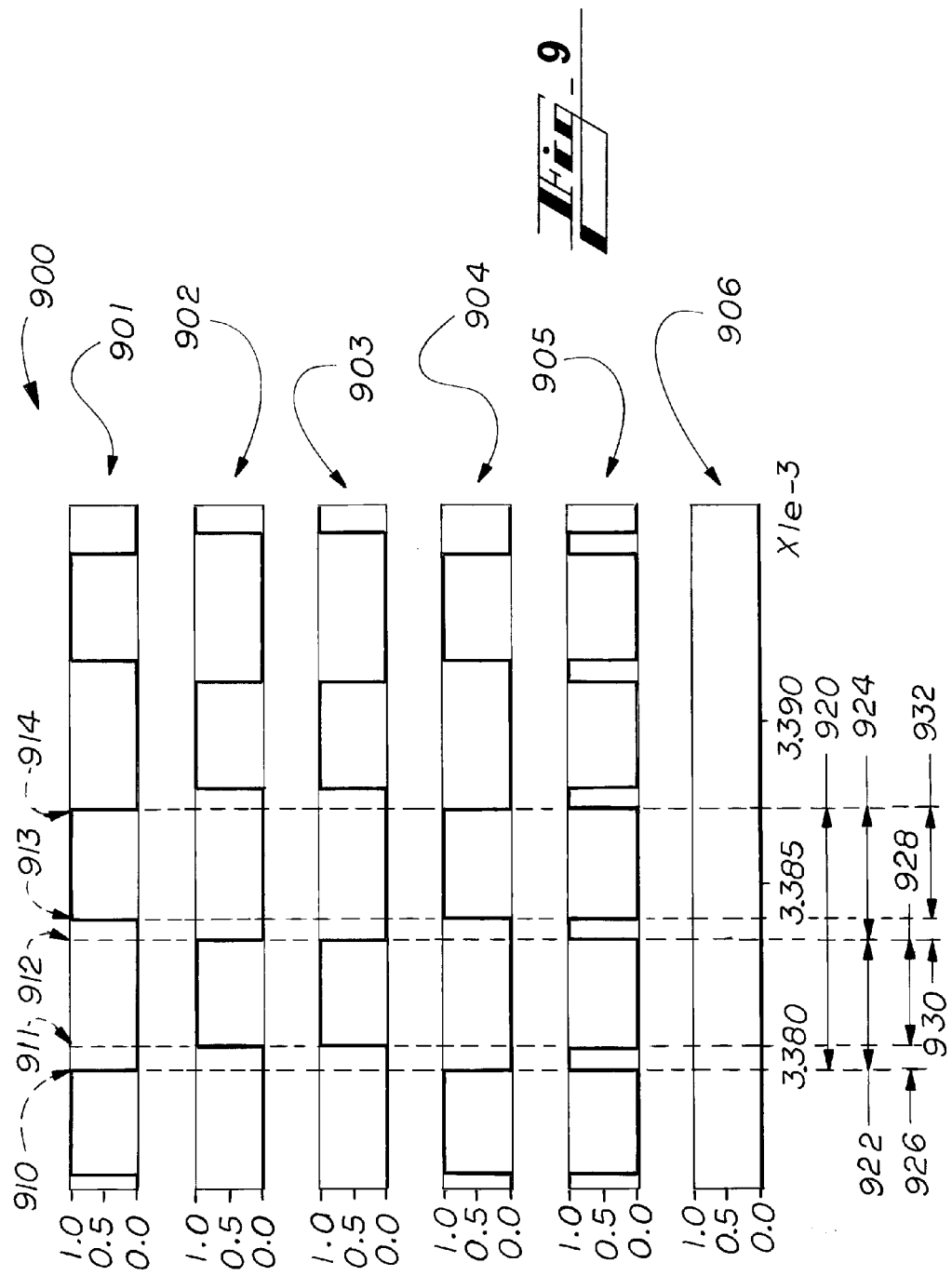
FIG. 9 illustrates an example positive-cycle timing diagram for control of the switches in the isolated unidirectional charger topology of FIG. 8.
Figure 10:
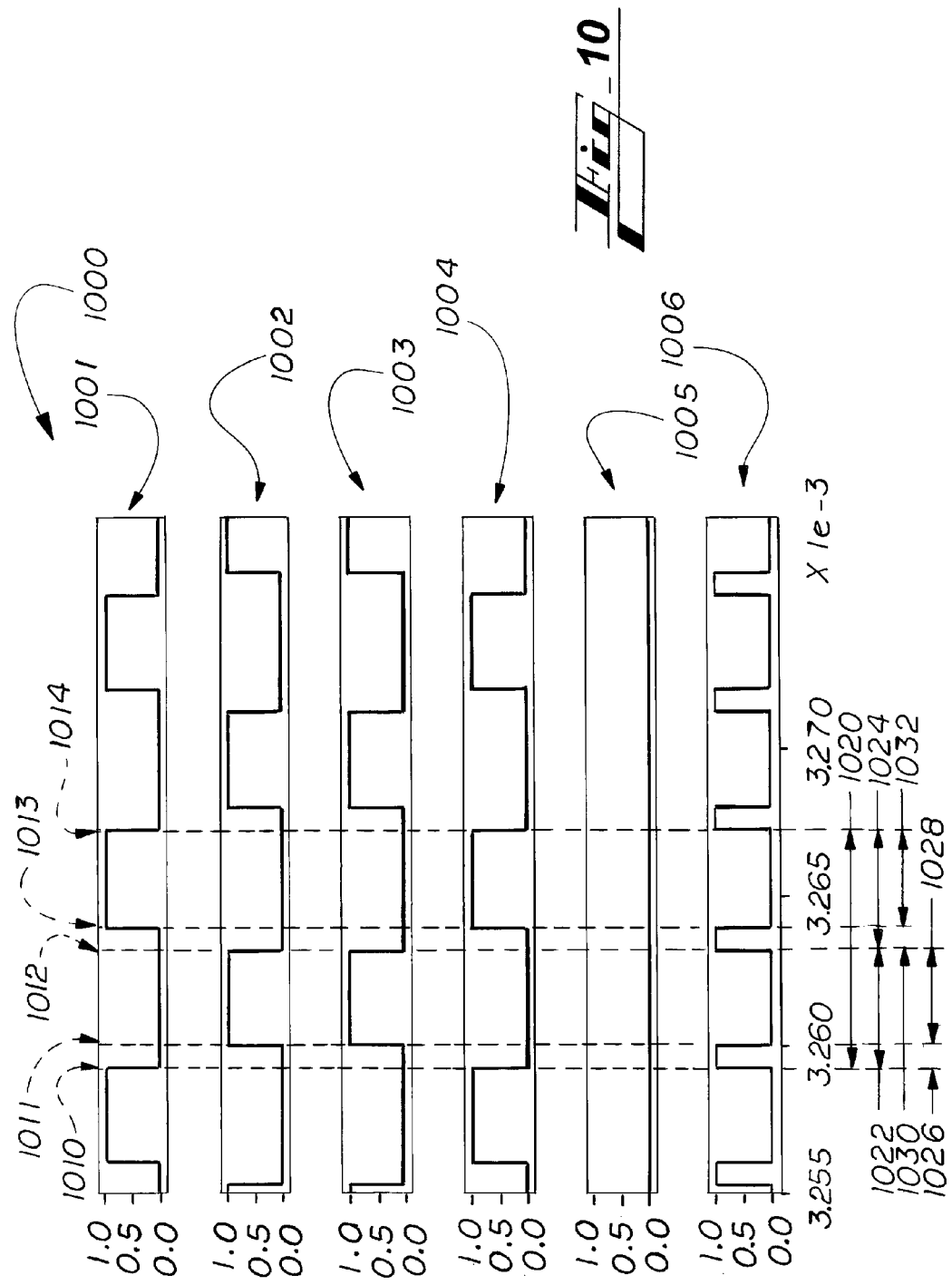
FIG. 10 illustrates an example negative-cycle timing diagram for control of the switches in the isolated unidirectional charger topology of FIG. 8.

IX. FIGS. 9 AND 10—Cycle Timing Diagrams for Second Embodiment

FIG. 9 illustrates an example positive AC-voltage cycle timing diagram for control of the switches in the isolated unidirectional charger topology of FIG. 8. FIG. 10 illustrates an example negative AC-voltage cycle timing diagram for control of the switches in the isolated unidirectional charger topology of FIG. 8.

Both negative and positive-cycle timing diagrams are illustrated to account for the difference in switch operations, both when the input AC voltage 812 is positive and when the input AC voltage 812 is negative.

More particularly, the figures show, with respect to the negative and positive AC-voltage cycles, switching sequences for the first-stage switches 820, 822 and second-stage switches 824, 826, 828, 830, of FIG. 8.

Each of the diagrams 900, 1000 includes multiple sub-charts, each corresponding to one of the switches of the circuit 802 of FIG. 8.

More particularly, for FIG. 9, the sub-charts 901, 902, 903, 904, 905, 906, from top to bottom, show respectively switching sequences (ON/OFF, or closed/open) for the six FIG. 8 switches: the first through fourth switches 824, 826, 828, 830 of the DC-DC stage 806, and the two switches 820, 822 of the AC-DC stage 804.

For FIG. 10, the sub-charts 1001, 1002, 1003, 1004, 1005, 1006, from top to bottom, show respectively switching sequences (ON/OFF; or, closed/open) for the same switches (the first through fourth switches 824, 826, 828, 830 of the DC-DC stage 806, and the two switches 820, 822 of the AC-DC stage 804).

Each sub-chart includes an x-axis representing passage of time and, therein, time periods described more below. Each sub-chart also includes a y-axis showing 0, 0.5, and 1.0 corresponding to whether the corresponding switch is OFF (zero, 0) or ON (1.0) during the time periods.

Other aspects of the charts, e.g., reference times, time periods, cycles, sub-cycles, and intervals, can be referenced as above for FIG. 3, with any changes mentioned expressly here or shown (e.g., size of time intervals) in FIGS. 9 and 10, so are not described again here in detail.

With further reference to the figures, during the positive cycles (FIG. 9), the second AC-DC-stage switch 822 is turned OFF and the first AC-DC switch 820 is modulated. During negative cycles (FIG. 10), the first switch 820 is kept OFF while the second switch 822 is modulated.

Reference is now made to the first time interval 926, of the first switching sub-cycle 922, for positive input voltage (FIG. 9). As shown, at the start time 910 ($t_0$), the first AC-DC-stage switch 820 is turned ON (closed) and remains ON through to the end of the interval 926 (i.e., through to the first time 911 ($t_1$)).

As with the first interval 326 of the first embodiment, the first time interval 926, 1026, of the positive and negative cycles of FIGS. 9 and 10, have periods equal to a pre-generated duty cycle $D(t) \cdot T(s)$. Again, here, the duty cycle $D(t)$ is a pulse-width-modulated variable duty cycle generated by control circuitry (e.g., PWM generator) to be described further below in connection with FIG. 11.

And the even intervals 928, 1028, 932, 1032, like the even intervals 328, 332 of the first embodiment, have a duty cycle having a period of $(1-D(t)) \cdot T(s)$.

With further reference to the positive cycles of FIG. 9, at the start reference time 910 (or, $t_0$), the first AC-DC-stage switch 820 is turned ON (closed) and remains ON for this first time interval 926. This ON (closed) switching action enables the boost operation and stores energy in the current-shaping boost inductor 815.

As further shown in FIG. 9, during the first interval 926 of the positive cycle, the four DC-DC-stage switches 824, 826, 828, 830, corresponding to sub-charts 901, 902, 903, 904, respectively, are OFF (open).

According to these sequences, the full-bridge stage (806) switch components (e.g., MOSFET including anti-parallel diodes across the switches) enable a current path between the DC link capacitor 808 and energy in the transformer leakage inductor 832.

According the illustrated sequences of FIG. 9, every switching cycle has one short circuit operation for the boost stage, when the first AC-DC-stage switch 820 is switched ON during the positive half cycle, for time intervals equal to $D(t) \cdot T(s)$—i.e., between time $t_0$-$t_1$, of the first cycle, 922, and $t_2$-$t_3$, of the second cycle 924, as shown in FIG. 9.

In the second interval 928 ($t_1$-$t_2$), the first and fourth DC-DC-stage switches 824, 830 are switched ON in alternating switching cycles with the second and third DC-DC-stage switches 826, 828. This means that if, in the first switching cycle 922, at the first time 911 ($t_1$), the first and fourth switches 824, 830 are ON, then in the next switching cycle 924, at the third time 913 ($t_3$), the other two second-stage switches 826, 828 are ON, as shown in FIG. 9.

As in the first embodiment, which set of switches is ON while the others are OFF controls a direction of the current through the circuit 200, and more particularly through the transformer.

With further reference to the negative cycle (FIG. 10), an overall sequence 1020 begins at the start time 1010 (or, $t_0$) and ends at the fourth time 1014 ($t_4$). As referenced above, at the start time, $t_0$, the second AC-DC-stage switch 822 is turned ON (closed) for a period equal to the pre-generated duty cycle, $D(t) \cdot T(s)$. As referenced above, $D(t)$ is a pulse width modulated variable duty cycle generated by the control circuitry shown in FIG. 11. Again, this closed switching action enables the boost operation and stores energy in the current shaping boost inductor 815.

During the first interval 1026, the four second-stage switches 824, 826, 828, 830, corresponding to sub-charts 1001, 1002, 1003, 1004, are OFF (open state).

According to these sequences, the full-bridge stage (806) switch components enable a freewheeling current path between the DC link capacitor 808 and energy in the transformer leakage inductor 832.

According to the illustrated sequences of FIG. 10, every switching cycle has one short circuit operation for a boost stage, when the first AC-DC-stage switch 822 is switched ON during the positive half cycle, for the odd time intervals (e.g., 1026, 1030) having a duty cycle of $D(t) \cdot T(s)$.

Further regarding the negative half cycle (FIG. 10), and similar to the positive half cycle of operation (FIG. 9), in the even intervals (i.e., second interval 1038, fourth interval 1042, etc.), the first and fourth DC-DC-stage switches 824, 830 are switched ON in alternating switching cycles with the second and third DC-DC-stage switches 826, 828. As in the first two embodiments, which set of switches is ON while the others are OFF controls a direction of the current through the circuit 800, and more particularly through the transformer. The switching can be viewed to simulate alternating current, the format that the transformer is configured to handle.

X. FIG. 11—Control Diagram for Second-Embodiment Charger

Figure 11:
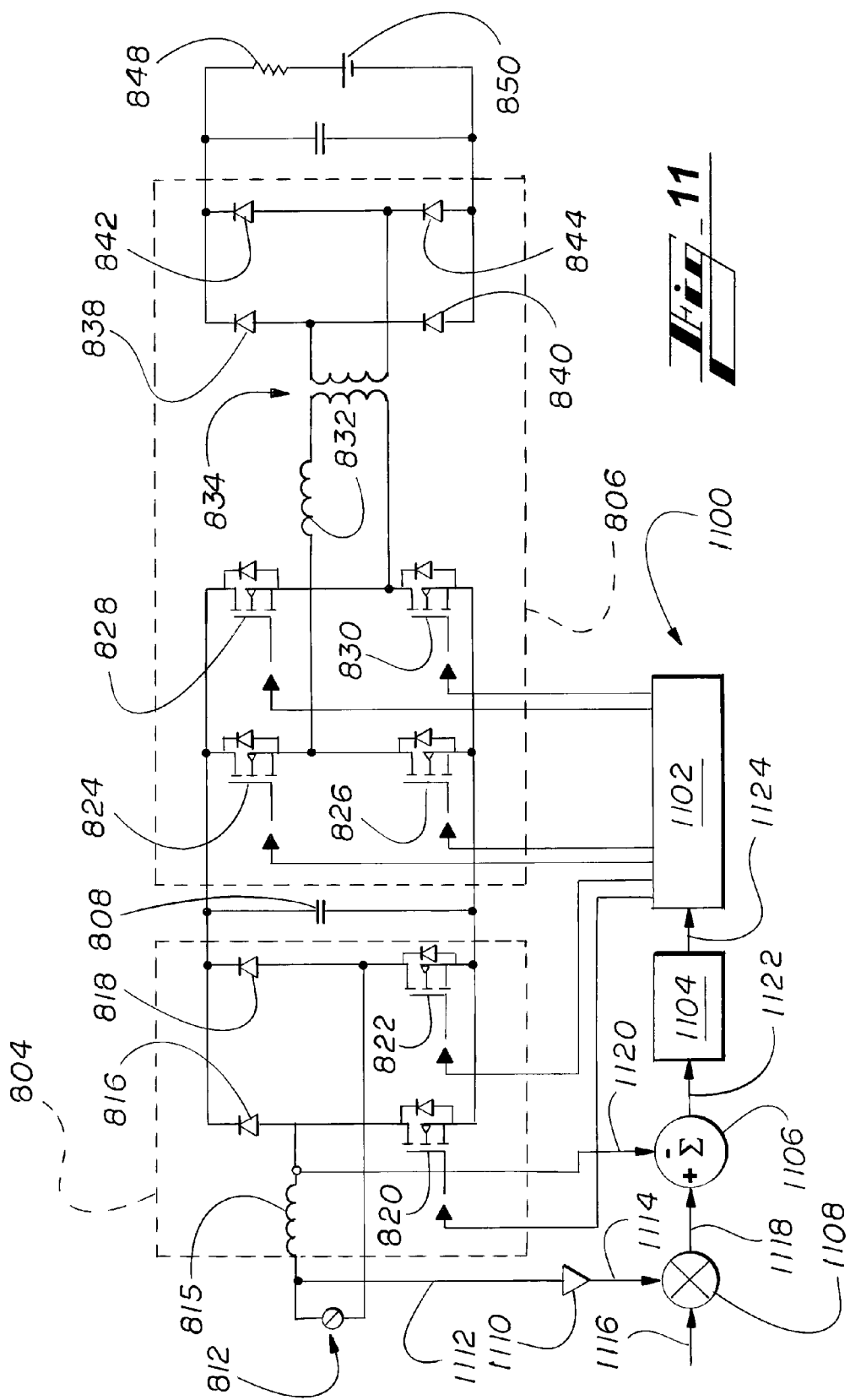
FIG. 11 illustrates an example control diagram for use in controlling the isolated unidirectional charger of FIG. 8.

FIG. 11 illustrates an example control diagram for use in controlling the isolated unidirectional charger 802 of FIG. 8.

The control diagram and associated functions illustrated in FIG. 11 are in some ways the same as those described above in connection with FIG. 4. Some of the features they have in common, and some differences, are described here, below. For brevity, all features common between the two embodiments are not described, and are considered disclosed here by reference.

As with the embodiment of FIG. 4, the control circuit 1100 of FIG. 11 is arranged to generate and process a reference current and duty cycle in generating pulse-width-modulated (PWM) control signals. The signals are passed to the charger switches to control their ON/OFF timing.

And as with the first embodiment, the control sub-circuit 1100 of this second embodiment, corresponding to the control feature 810, includes a pulse-width-modulated (PWM) signal generator 1102 and a current controller 1104. The circuit 1100 further likewise includes a summation component 1106, or combiner, a multiplier component 1108, and a gain component 1110, e.g., amplifier, providing a desired gain (G). Any of the parts of the control circuit 1100 illustrated or described separately can be combined.

As also like the control sub-circuit of FIG. 4, for its control functions, the present control sub-circuit 1100 includes or is connected to any instrumentation needed for obtaining this and the other electrical current or voltage data described, such as one or more sensors or meters (not shown in detail), such as a voltage or current sensor, configured and positioned to provide the representations used.

And like the control sub-circuit of FIG. 4, the present control sub-circuitry 1100 obtains and uses input AC voltage for providing |sin(ωt)| template and AC input electrical current feedback signal respectively. The voltage and current data is indicated by communication lines 1112, 1120.

Different than the control sub-circuit of FIG. 4, though, in the embodiment of FIG. 11, with the boost inductor 815 preceding the rectifier 814, as shown in FIGS. 8 and 11, the voltage and inductor current data 1112, 1120 are both pre-rectifier representations. While other arrangements can also be used for shaping the input current, here the AC voltage is being processed to give the |sin(ωt)| shape for the inductor current to follow, instead of using the rectified voltage, as in the previous embodiment (e.g., FIG. 4), because the positive and negative AC cycle information is also needed.

As in the first case, the voltage data 1112 is processed (e.g., multiplied) by the component 1110 to generate |sin(ωt)| form—i.e., absolute value of the sine of ω*t, wherein ω (omega) represents angular frequency, and t is time. The result is passed as input 1114 to the multiplier 1108.

The multiplier 1108 also receives as a second input a pre-determined reference current value 1116 (e.g., a pre-set reference peak current value; or, $i_{ref}$). The value, including derivation thereof, is described above in connection with the value 416 of the first embodiment. As provided, the output battery voltage is regulated by using another outer voltage control loop giving this reference 1116, and the outer voltage control loop has not been shown, expressly, for brevity Using the two inputs 1114, 1116, the multiplier 1108 produces a representation of the shape and amplitude of reference inductor current 1118 (or $i_L^*(t)$). More particularly, the reference inductor current 1118 ($i_L^*(t)$) has a full-wave rectified form, and is obtained using value 1114 and the pre-selected reference peak current value 1116.

The summing component 1106 combines the reference inductor current 1118 ($i_L^*(t)$) and a measured inductor current feedback signal 1120 (or, $i_{L(meas)}$), which has a negative (−) value for the summation. The resulting sum represents a difference 1122, if any, between the reference current 1116 ($i_{ref}$) and the measured inductor current 1120 ($i_{L(meas)}$).

Based on the difference 1122, the current controller 1104 generates the duty cycle 1124 (D(t)), referenced above. The current controller 1104 can be configured in any appropriate manner, as described above, for performing the operations described herein.

Using the duty cycle (D(t)) 1124, the PWM generator 1102 generates pulse-width-modulated control signals that control the ON/OFF time interval of the switches 820, 822 of the AC-DC stage the full-bridge switches 824, 826, 828, 830 of the DC-DC stage. The generator 1102 can be configured in any appropriate manner, as described above.

As with the first embodiment, DC link voltage regulation is not needed in this second embodiment, at least because a pure DC output is no longer needed. Rather, source voltage 812, having in some cases a ripple at about twice the line frequency, not being transferred to an intermediate DC link (e.g., DC bus electrolytic capacity 118 of FIG. 1), is directed to the output battery load (not shown in detail). In this way, the output power does not have a pure DC form, and is, instead, DC with some AC-form current superimposed thereon—i.e., DC-form current with a large ripple, e.g., a ripple at about twice the line frequency.

As with the other embodiments, providing ripple current frequencies—i.e., DC current with some AC current superimposed thereon—to modern batteries (e.g., Li-ion batteries) does not, contrary to conventional thought, hinder the charging operation or degrade battery performance and, rather, improves charging efficiency as compared to conventional systems.

XI. FIG. 12—Unity Power Factor Chart for Second Embodiment

FIG. 12 illustrates a first chart 1200 showing data associated with example operation of the isolated unidirectional charger of FIG. 8, the data representing a unity-power-factor operation.

The chart 1200 of this embodiment illustrates results similar to those described above in connection with the similar chart 500 for the first embodiment, and is not described further.

Figure 13:
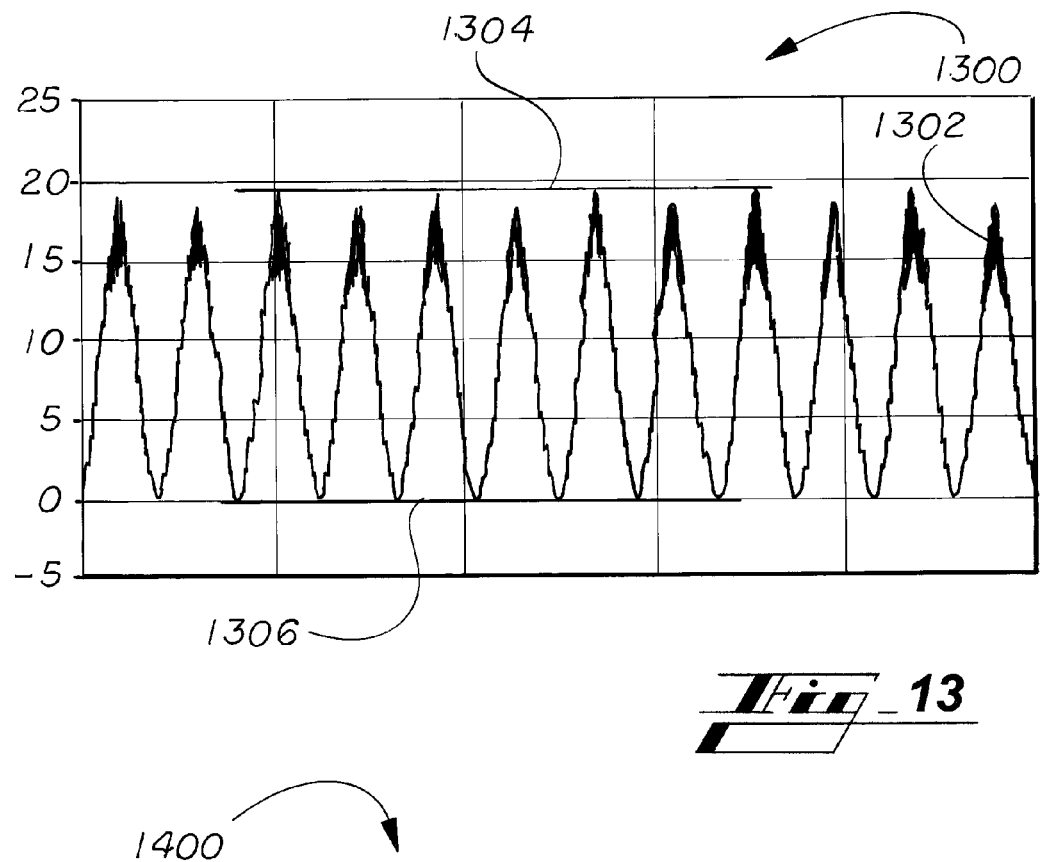
FIG. 13 illustrates a second chart showing data associated with operation of the isolated unidirectional charger of FIG. 8, the data representing a charger output current, measured in amperes (or amps, A), having a ripple at about twice the line frequency.

XII. FIG. 13—Second Charger Output Current

FIG. 13 illustrates a second chart showing data associated with operation of the second-embodiment isolated unidirectional charger of FIG. 8.

The chart 1300 of this embodiment illustrates results similar to those described above in connection with the similar chart 600 for the first embodiment, and is not described further.

Figure 14:
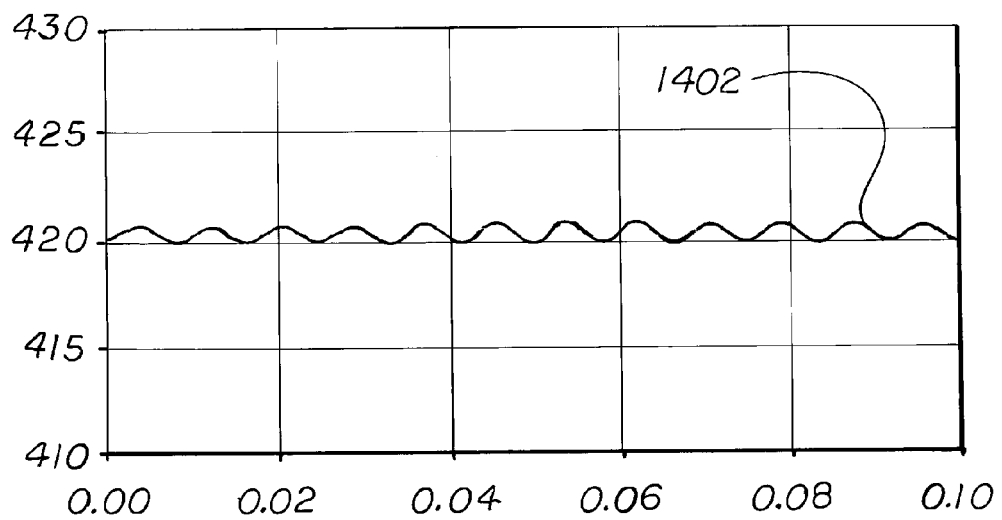
FIG. 14 illustrates a third chart showing data associated with operation of the isolated unidirectional charger of FIG.

XIII. FIG. 14—Second Charger Output Voltage

FIG. 14 illustrates a third chart showing data associated with operation of the isolated unidirectional charger of FIG. 8.

The chart 1400 of this embodiment illustrates results similar to those described above in connection with the similar chart 700 for the first embodiment, and is not described further.

XIV. FIG. 15—Power Circuitry According to a Third Embodiment

FIG. 15 illustrates a schematic of a third improved power circuit 1500, as an ideal representation, showing a topology of an isolated unidirectional charger 1502, according to a third embodiment of the present disclosure.

The circuit 1500 of this third embodiment is like the first embodiment 200 except a few differences. One primary difference is that the present circuit 1500 has no separate power-correction-factor sub-circuit (like PFC sub-circuit 224), or any first-stage switches (like switch 228).

As in the previous embodiments (FIGS. 2 and 8), the circuit 1500 of this embodiment includes two primary stages, a first, alternating-current-to-direct-current (AC-DC) stage 1504 and a full-bridge direct-current-to-direct-current (DC-DC) stage 1506.

The illustration for the circuit 1500 of this embodiment, differing from the earlier embodiments, does not show a high-frequency (HF) capacitor (e.g., parts 208, 808) for ideal circuit representation. An HF capacitor is not shown between the AC-DC and DC-DC stages of the illustration to represent an ideal circuit because the leakage inductance of the transformer can be neglected in a sense, and hence there is no express need for a capacitor for the freewheeling current to dissipate the energy in the leakage inductance. In practical realizations of the technology, an HF capacitor can be included here to provide a freewheeling current path.

The circuit 1500 of this embodiment, like the previous embodiments, includes or is connected to a controller 1510 controlling operation of the circuit 1500.

As in the earlier embodiments, the controller 1510 here receives various inputs, described further below, including in connection with the control circuit 1700 of FIG. 17, and controls operation of the switches of the charger 1502.

And, as in the previous embodiments, the circuit 1500 is configured to receive an alternating-current (AC) grid voltage via an input terminal 1512. Again, the voltage 1512 is provided by an AC input voltage source (not shown in detail). The source is any appropriate AC voltage source, such as at a home or fuel-station, or an AC generator.

The source in some implementations includes or is a part of an intelligent energy network or grid. And, as provided, while the input voltage may be referred to herein as a grid voltage, other sources include generators, or any source of sufficient levels of AC voltage.

The first, AC-DC, stage 1504 of this embodiment includes a rectifier circuit 1514. The rectifier sub-circuit 1514, or rectifier, in one implementation includes four diodes 1516, 1518, 1520, 1522. In operation, the rectifier 1514 rectifies the input AC voltage 1512 and the boost AC inductor 1524 in conjunction with the DC-DC Stage switches gives the power factor correction.

The second, DC-DC, stage 1506 of the charger 1502 of this embodiment includes multiple switches. While the stage 1506 may include other arrangements and numbers of switches, in the illustrated embodiment, the stage includes four switches 1526, 1528, 1530, 1532.

The DC-DC stage 1506 of this embodiment, like that of the first embodiment of FIG. 2, forms a full-bridge DC-DC converter. The stage 1506 includes a high-frequency transformer 1536 in connection with this function.

In operation, the HF transformer 1536, like that of the first two embodiments, provides electrical isolation for the stage 1506, and so can be referred to as an isolation transformer.

The transformer 1536, like each transformer disclosed herein, can be considered to operate at any appropriate ratio to accomplish desired goals, including those described herein. The ratio can be referred to generically as being 1:N, where N includes any positive, non-zero, number.

The DC-DC stage 1506 also, like the stage 206 of the first embodiment, includes a rectifier 1538 coupled to output side of the isolation transformer 1536. While the rectifier 1538 can include other arrangements, e.g., numbers of diodes, in the implementation of FIG. 15, the group includes four diodes 1540, 1542, 1544, 1546 (or, $D_5$-$D_8$), as shown.

Following the DC-DC stage 1506, embodiments of the charger 1502 also include another capacitor 1548 for filtering and a resistor 1550 representing the effective internal resistance of the battery, positioned as shown in FIG. 15. The charger 1502 includes an output terminal 1552 by which voltage is provided to the battery to be charged (battery not shown in detail).

In operation, the controller 1510 controls, as represented schematically in FIG. 15, opening and closing of the full-bridge switches 1526, 1528, 1530, 1532.

By controlling the switches, the control apparatus 1510 controls, e.g., timing of a boost inductor current passing through the charger 1502. And by doing so, the control apparatus 1510 controls the full-bridge functions of the second, full-bridge, stage 1506 and the power factor correction for supplying the desired DC-charging current to the battery—i.e., a current having a relatively large ripple (AC current superimposed on the DC current), such as a ripple equal to about twice the amplitude of the average DC current at about twice the line frequency. Benefits of this operation are referenced above and described further below.

XV. FIG. 16—Timing Diagram for Controlling Third-Embodiment Charger

FIG. 16 illustrates an example timing diagram for control of the switches in the isolated unidirectional charger topology of FIG. 15.

FIG. 16 shows a switching sequence for the switches 1526, 1528, 1530, 1532 for the embodiment shown in FIG. 15. More particularly, the diagram 1600 includes multiple sub-charts, each corresponding to one of the switches of the circuit 1502 of FIG. 15. In further detail, sub-charts 1601, 1602, 1603, 1604, from top to bottom, show respectively switching sequences (on/off, of closed/open) for the four FIG. 15 switches 1526, 1528, 1530, 1532, each switch, in this embodiment, being of the second, DC-DC, stage.

Each sub-chart 1601, 1602, 1603, 1604 includes an x-axis representing passage of time and, therein, time periods described more below. Each sub-chart also includes a y-axis showing 0, 0.5, and 1.0 corresponding to whether the corresponding switch is OFF (zero, 0) or ON (1.0) during the time periods.

Because many of the aspects of the sub-charts 1601, 1602, 1603, 1604, e.g., reference times, time periods, cycles, sub-cycles, are like those described above in connection with FIGS. 3, 9, and 10, and many relevant differences (e.g., size of time intervals) are shown in FIG. 16, not all aspects of the timing sub-charts 1601, 1602, 1603, 1604 are described, here.

As referenced above in connection with FIG. 15, a primary difference between the third embodiment and the first embodiment is that the third embodiment lacks a PFC switch, or any AC-DC-stage switch.

With further reference to FIG. 16, according to the same convention of the earlier time-sequence diagrams, odd intervals are labeled 1626 and 1630, and even intervals are labeled 1628 and 1632.

As in the earlier embodiment, the odd intervals 1626, 1630 have periods equal to a pre-generated duty cycle $D(t) \cdot T(s)$. And, again, the duty cycle $D(t)$ is a pulse-width-modulated variable duty cycle generated by control circuitry (e.g., PWM generator) to be described further below in connection with FIG. 17.

And the even intervals 1628, 1632, like the even intervals 328, 332 of the first embodiment, have an inverse duty cycle of period, $(1-D(t)) \cdot T(s)$.

In every odd interval (1626, 1630, etc.) each of the four switches of the charger 1502 are ON, enabling the boost action. In the second interval 1628, the first and fourth switches 1526, 1532 remain ON (closed) from the interval, while the second and third switches 1528, 1530 are turned OFF (opened). In the fourth interval 1632, the second and third switches 1528, 1530, this time, remain ON from the previous, second, interval, while the other two—i.e., the first and fourth—switches 1526, 1532 are turned OFF. As in the first two embodiments, which set of switches is ON, while the others are OFF, controls a direction of the current through the circuit 1500, and more particularly through the transformer. The switching can be viewed to simulate alternating current, the format that the transformer is configured to handle.

XVI. FIG. 17—Control Diagram for Third-Embodiment Charger

FIG. 17 illustrates an example control diagram for use in controlling the isolated unidirectional charger of FIG. 15.

The control diagram and associated functions illustrated in FIG. 17 are in some ways the same as those described above in connection with FIGS. 4 and 11. Some of the features they have in common, and some differences, are described here, below. For brevity, all features common between this and the earlier embodiments are not described, and are considered disclosed here by reference.

As with the embodiment of FIG. 4, the control circuit 1700 of FIG. 17 is arranged to process a reference current and intra-charger current characteristics in generating pulse-width-modulated (PWM) control signals. The signals are passed to the charger switches to control their ON/OFF timing.

And as with the first embodiment, the control sub-circuit 1700 of this second embodiment includes a pulse-width-modulated (PWM) signal generator 1702 and a current controller 1704. The sub-circuit 1700 further likewise includes a summation component 1706, or combiner, a multiplier component 1708, and a gain component, e.g., amplifier 1110, providing a desired gain (G). Any of the parts of the control sub-circuit 1700 illustrated or described separately can be combined.

As also with the earlier embodiments, for its control functions, the present sub-circuit 1700 includes or is connected to any instrumentation needed for obtaining this and the other electrical current data described, such as one or more sensors or meters (not shown in detail), such as a voltmeter or multimeter, configured and positioned to provide the representations used.

And like the earlier control circuits, the present circuitry 1700 obtains and uses electrical rectified voltage and inductor current data. The voltage and current data is indicated by communication lines 1712, 1720.

As in the first embodiment, in the circuit of FIG. 17, with the boost inductor 1524 following the rectifier (including diodes 1516, 1518, 1520, 1522), the referenced electrical current data 1712, 1720 are taken from post-rectifier current.

And as in the first and second embodiments, the rectifier-output-voltage representation 1712 is multiplied be the gain component 1710 and passed as input 1714 to the multiplier 1708. The input 1714 ensures the shape of the input current based on the template of the form |Sin(ωt)|—i.e., absolute value of the sine of ω*t, wherein ω (omega) represents angular frequency, and t is time, provided by measuring the rectifier output voltage |VAC(t)|. Again, the main objective here is to draw a sinusoidal current in phase with the utility voltage. This can be done in many ways such as above—phase-locked loop, etc.

The multiplier 1708 also receives as a second input a pre-determined reference current value 1716 (e.g., a pre-set reference peak current value; or, $i_{ref}$). The value, including derivation thereof, is described above in connection with the value 416, 1116 of the first two embodiments.

Using the two inputs 1714, 1716, the multiplier 1708 produces a representation of the shape and amplitude of reference inductor current 1718 ($i_L^*(t)$). More particularly, the reference inductor current 1718 ($i_L^*(t)$) has a full-wave rectified form, and is obtained using an absolute value of the measured rectifier output voltage value 1714 and the reference peak current value 1716.

The summing component 1706 combines the reference inductor current 1718 ($i_{L^*}$) and a measured inductor current feedback signal 1720 (or, $i_{L(meas)}$), which has a negative (−) value for the summation. The resulting sum represents a difference 1722, if any, between the reference current 1716 ($i_{ref}$) and the measured inductor current 1720 ($i_{L(meas)}$).

Based on the difference 1722, the current controller 1704 generates the duty cycle 1724 (D, or D(t)), referenced above. The controller 1704 can be configured in any appropriate manner, as described above, for performing the operations described herein.

Using the duty cycle (D(t)) 1724, the PWM generator 1702 generates pulse-width-modulated control signals that control the ON/OFF time interval of the switches 1526, 1528, 1530, 1532. The generator 1702 can be configured in any appropriate manner, as described above.

As with the first embodiment, DC link voltage regulation is not needed in this third embodiment, at least because a pure DC output is no longer needed. Rather, source voltage 1512, having in some cases a ripple at about twice the line frequency, not being transferred to an intermediate DC link (e.g., DC bus electrolytic capacity 118 of FIG. 1), is directed to the output battery load (not shown in detail) via the output terminal 1550. In this way, the output power does not have a pure DC form, and is, instead, DC with some AC-form current superimposed thereon—i.e., DC-form current with a large ripple, e.g., a ripple at about twice the line frequency.

As with the other embodiments, providing ripple current frequencies—i.e., DC current with some AC current superimposed thereon—to modern batteries (e.g., Li-ion batteries) does not, contrary to conventional thought, hinder the charging operation or degrade battery performance and, rather, improves charging efficiency as compared to conventional systems.

XVII. FIG. 18—Unity Power Factor Chart for Third Embodiment

FIG. 18 illustrates a first chart showing data associated with example operation of the isolated unidirectional charger of FIG. 15, the data representing a unity-power-factor operation.

The chart 1800 of this embodiment illustrates results similar to those described above in connection with the similar charts 500, 1200 for the first and second embodiments, and is not described further.

XVIII. FIG. 19—Third Charger Output Current

FIG. 19 illustrates a second chart showing data associated with operation of the isolated unidirectional charger of FIG. 15.

The chart 1900 of this embodiment illustrates results similar to those described above in connection with the similar charts 600, 1300 for the first and second embodiments, and is not described further.

XIX. FIG. 20—Third Charger Output Voltage

FIG. 20 illustrates a third chart showing data associated with operation of the third-embodiment isolated unidirectional charger, of FIG. 15, the data representing a charger output voltage, measured in volts (V), with a relatively-small, 120 Hz, ripple on top of the DC voltage.

The chart 2000 of this embodiment illustrates results similar to those described above in connection with the similar charts 700, 1400 for the first and second embodiments, and is not described further.

XX. Methods of Operation

Figures outlining expressly the processes described herein are not provided. Step-wise flow charts of a typical style can be drawn readily representing the functions and operations described herein. The steps can include, for instance, any of the control functions and operations described above.

It should be understood that the steps of the methods need not in all cases necessarily be in any particular order, and that performance of some or all the steps in an alternative order is possible and is contemplated.

Steps are at least in some instances described in a demonstrated order for ease of description and illustration. Steps can be added, omitted and/or performed simultaneously without departing from the scope of the appended claims.

In certain embodiments, some or all steps of the processes, and/or substantially equivalent steps are performed by a processor, e.g., computer processor, executing computer-executable instructions stored or included on a computer-readable medium, such as the memory or computer storage device of the systems or apparatus described above.

XXI. Select Advantages and Benefits

Advantages of chargers configured according to the present technology include a relatively smaller size. The smaller size results at least in part by the chargers not having a three-power-stage arrangement of conventional chargers (i.e., stages 102, 104, 106 of FIG. 1), and by not having DC capacitors 118, which are often bulky. Saving space in vehicles, such as automobiles, is important where package volume is a premium.

Related to size benefits, the novel chargers are also lighter. The chargers have less mass due at least to their lacking DC capacitors.

Advantages of chargers configured according to the present technology also include relatively low price. The lower price results in part to the chargers not having the three-power-stage arrangement of conventional chargers (i.e., stages 102, 104, 106), and not having DC capacitors 118.

Advantages of chargers configured according to the present technology also include relatively higher reliability. Increased reliability results at least in part to the chargers not having a conventional bulky DC capacitor 118, which has less than optimal qualities, as described above.

Still another advantage of the present chargers is that they have improved battery cycle life and charging efficiency as compared to conventional chargers, as described.

Advantages of chargers configured according to the present technology also include relatively-simpler control requirements. As provided, conventional unidirectional chargers require two-stage control for input current shaping and output voltage control.

XXII. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims.

All such variations, modifications, and combinations are included herein by the scope of this disclosure and the following claims.

What is claimed:

1. A charging system, for use in providing power for charging a battery, comprising:
   a first, alternating-current-to-direct-current, stage comprising:
      a single-phase diode rectifier for rectifying an input alternating-current input voltage; and
      a power-factor-correcting sub-circuit including a switch;
   a second, direct-current-to-direct-current, stage comprising multiple switches;
   a high-frequency capacitor connected between the first stage and the second stage; and
   a controller connected to the switches of the first and second stages and configured to control, by way of the switches, timing of boost inductor current passing through the charging system.

2. The charging system of claim 1, wherein the rectifier of the first stage comprises multiple diodes.

3. The charging system of claim 2, wherein the multiple diodes of the first stage consists of four diodes.

4. The charging system of claim 1, wherein the high-frequency capacitor is a high-frequency direct-current link capacitor for providing a freewheeling current path.

5. The charging system of claim 1, wherein the power-factor-correcting sub-circuit is configured and arranged in the system to supplement the rectifier sub-circuit to meet harmonic limits for current passing through the system.

6. The charging system of claim 1, wherein the power-correcting-factor sub-circuit comprises one or both of a boost inductor and a power-factor-correcting diode.

7. The charging system of claim 1, wherein the switch of the power-factor-correcting sub-circuit is a power-factor-correcting boost-converter switch.

8. The charging system of claim 1, wherein the controller being configured to control timing of boost inductor current passing through the charging system includes being configured to control full-bridge functions of the second stage for supplying a primarily direct-current charging current to the battery.

9. The charging system of claim 8, wherein the primarily direct-current charging current includes a relatively large alternating-current ripple superimposed with a direct current.

10. The charging system of claim 9, wherein the alternating-current ripple has an amplitude that is about twice an amplitude of an average of the direct current and is at about twice a line frequency.

11. The charging system of claim 1, wherein the multiple switches of the second stage comprise four full-bridge active switches.

12. The charging system of claim 1, wherein:
    the second stage comprises:
       an inductor; and
       a high-frequency isolation transformer for providing electrical isolation for the second stage; and
    the inductor is a leakage inductance of the transformer.

13. The charging system of claim 12, wherein:
    the second stage comprises a direct-current-to-direct-current-stage rectifier coupled to a downstream side of the high-frequency isolation transformer; and
    the direct-current-to-direct-current-stage rectifier of the second stage comprises a diode group consisting of four diodes.

14. A charging system, for use in providing power for charging a battery, comprising:
    a first, alternating-current-to-direct-current, stage comprising a bridgeless boost-rectifier sub-circuit for rectifying an input alternating-voltage voltage, the bridgeless boost-rectifier sub-circuit comprising at least one switch;
a second, direct-current-to-direct-current, stage comprising multiple switches;
a high-frequency capacitor connected between the first stage and the second stage; and
a controller connected to the switches of the first and second stages and configured to control, by way of the switches, timing of boost inductor current passing through the charging system.

15. The charging system of claim 14, wherein the bridgeless boost-rectifier sub-circuit comprises:
an alternating-current inductor at an entrance to the sub-circuit; and
two diodes.

16. The charging system of claim 14, wherein the bridgeless boost-rectifier sub-circuit is configured to rectify the input voltage in accord with a predetermined power factor.

17. A charging system, for use in providing power for charging a battery, comprising:
a first, alternating-current-to-direct-current, stage comprising:
a single-phase diode rectifier for rectifying an input alternating-current input voltage; and
a power-factor-correcting switch downstream of the single-phase diode rectifier in the alternating-current-to-direct-current stage;
a second, direct-current-to-direct-current, stage downstream of the first, alternating-current-to-direct-current, stage, comprising multiple switches; and
a controller connected to the switches of the first stage and the second stage and configured to control, by way of the switches, timing of boost inductor current passing through the charging system.

18. The charging system of claim 17, wherein the second stage comprises a high-frequency isolation transformer for providing electrical isolation for the second stage.

19. The charging system of claim 17, wherein:
the second stage comprises a direct-current-to-direct-current-stage rectifier coupled to a downstream side of the isolation transformer; and
the direct-current-to-direct-current-stage rectifier of the second stage comprises a diode group consisting of four diodes.

20. The charging system of claim 17, further comprising a high-frequency capacitor connected between the first stage and the second stage.

* * * * *